(12) United States Patent
Sugimura

(10) Patent No.: US 9,513,800 B2
(45) Date of Patent: Dec. 6, 2016

(54) INFORMATION PROCESSING APPARATUS AND MEDIUM FOR CORRECTING THE START AND END TIME DATA BASED ON HANDWRITING USER INPUT

(71) Applicant: Yoshihiko Sugimura, Nagoya (JP)

(72) Inventor: Yoshihiko Sugimura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 520 days.

(21) Appl. No.: 14/062,944

(22) Filed: Oct. 25, 2013

(65) Prior Publication Data

US 2014/0317553 A1 Oct. 23, 2014

(30) Foreign Application Priority Data

Apr. 18, 2013 (JP) ................................. 2013-087582

(51) Int. Cl.
*G06F 3/0488* (2013.01)
*G06F 3/041* (2006.01)
(Continued)

(52) U.S. Cl.
CPC ....... *G06F 3/04883* (2013.01); *G06F 3/03545* (2013.01); *G06F 3/041* (2013.01); *G06F 17/242* (2013.01)

(58) Field of Classification Search
CPC .. G06F 3/04883; G06F 3/03545; G06F 3/041; G06F 17/242
See application file for complete search history.

(56) References Cited

U.S. PATENT DOCUMENTS 4,780,839 A * 10/1988 Hirayama .............. G04G 11/00
368/82
4,890,258 A * 12/1989 Tsugei ................... G04G 11/00
708/112
(Continued)

FOREIGN PATENT DOCUMENTS

EP 2725461 A2 4/2014
GB 2306669 A 5/1997
(Continued)

OTHER PUBLICATIONS

Co Pending U.S. Appl. No. 14/062,964, filed Oct. 25, 2013.
(Continued)

*Primary Examiner* — Jung-Mu Chuang
(74) *Attorney, Agent, or Firm* — Banner & Witcoff, Ltd.

(57) ABSTRACT

An information processing apparatus includes a processor and a memory storing instructions. The instructions instruct the processor to execute acquiring start time data identified based on first stroke data input by handwriting, acquiring end time data identified based on second stroke data input by handwriting, first correcting the start time data by entering a first numerical value corresponding to a first unit that is the unit of time for which the numerical value is not identified, based on the end time data, when a numerical value corresponding to a unit of time cannot be identified, and second correcting the end time data by entering a second numerical value corresponding to a second unit that is the unit of time for which the numerical value is not identified, based on the start time data, when a numerical value corresponding to a unit of time cannot be identified.

16 Claims, 13 Drawing Sheets

(51) Int. Cl.
*G06F 3/0354* (2013.01)
*G06F 17/24* (2006.01)

(56) References Cited

U.S. PATENT DOCUMENTS

| | | | |
|---|---|---|---|
| 5,704,029 A * | 12/1997 | Wright, Jr. | G06F 17/243 345/173 |
| 5,959,615 A * | 9/1999 | Yamade | G06F 3/04847 345/173 |
| 6,052,481 A | 4/2000 | Grajski et al. | |
| 6,088,481 A * | 7/2000 | Okamoto | G06F 3/0488 345/179 |
| 6,144,371 A | 11/2000 | Clary et al. | |
| 6,144,764 A * | 11/2000 | Yamakawa | G06K 9/00429 382/187 |
| 6,236,396 B1 * | 5/2001 | Jenson | G06F 3/0488 345/179 |
| 6,392,669 B1 | 5/2002 | Matoba et al. | |
| 6,456,740 B1 | 9/2002 | Carini et al. | |
| 6,666,376 B1 | 12/2003 | Ericson | |
| 7,091,959 B1 | 8/2006 | Clary | |
| 7,426,288 B2 * | 9/2008 | Sakamoto | G06K 9/00154 382/119 |
| 7,757,183 B2 * | 7/2010 | Rutledge | G06F 19/322 705/2 |
| 8,364,300 B2 * | 1/2013 | Pouyez | G06Q 10/10 700/108 |
| 8,412,615 B2 * | 4/2013 | Du Preez | G06Q 30/06 705/37 |
| 8,775,303 B2 * | 7/2014 | Higgins | G06F 21/335 705/39 |
| 8,972,784 B2 * | 3/2015 | Mangold | G06F 11/3688 714/25 |
| 9,047,508 B2 * | 6/2015 | St. Jacques | G06K 9/00422 |
| 9,195,326 B2 * | 11/2015 | Sugimura | G06F 3/041 |
| 9,239,676 B2 * | 1/2016 | Inoue | G06F 3/041 |
| 9,285,984 B2 * | 3/2016 | Ichikawa | G06F 3/04883 |
| 2002/0009226 A1 * | 1/2002 | Nakao | G06K 9/222 382/177 |
| 2002/0067854 A1 | 6/2002 | Reintjes et al. | |
| 2002/0107885 A1 | 8/2002 | Brooks et al. | |
| 2002/0163511 A1 | 11/2002 | Sekendur | |
| 2002/0198935 A1 * | 12/2002 | Crandall, Sr. | G06F 17/243 709/203 |
| 2003/0054325 A1 * | 3/2003 | Miller | G09B 19/18 434/108 |
| 2003/0106985 A1 * | 6/2003 | Fagin | G06F 3/0317 250/208.1 |
| 2004/0064787 A1 | 4/2004 | Braun et al. | |
| 2004/0070573 A1 * | 4/2004 | Graham | G06F 3/04883 345/179 |
| 2004/0189708 A1 * | 9/2004 | Larcheveque | G06F 17/2247 715/780 |
| 2004/0196313 A1 | 10/2004 | Wynn et al. | |
| 2004/0243445 A1 * | 12/2004 | Keene | G06F 19/3456 705/2 |
| 2007/0143402 A1 * | 6/2007 | Kumagai | B43L 1/00 709/204 |
| 2008/0065396 A1 | 3/2008 | Marshall | |
| 2008/0181501 A1 * | 7/2008 | Faraboschi | G06F 3/03545 382/179 |
| 2008/0260241 A1 | 10/2008 | Ye et al. | |
| 2010/0251300 A1 * | 9/2010 | Fahey | H04N 5/44543 725/39 |
| 2012/0278660 A1 * | 11/2012 | Mangold | G06F 11/3688 714/38.1 |
| 2013/0055742 A1 * | 3/2013 | Ouchi | F25D 21/002 62/155 |
| 2013/0198288 A1 * | 8/2013 | Jones | H04L 12/1831 709/204 |
| 2014/0019855 A1 * | 1/2014 | Kim | G06Q 10/10 715/268 |

FOREIGN PATENT DOCUMENTS

| | | |
|---|---|---|
| JP | 62-179075 A | 8/1987 |
| JP | 63-115266 A | 5/1988 |
| JP | 01-118955 A | 5/1989 |
| JP | 04-048375 A | 2/1992 |
| JP | H05-61876 A | 3/1993 |
| JP | H08-335210 A | 12/1996 |
| JP | H09-319504 A | 12/1997 |
| JP | 11-203409 A | 7/1999 |
| JP | 2000-057217 A | 2/2000 |
| JP | 2000-315241 A | 11/2000 |
| JP | 2000-353049 A | 12/2000 |
| JP | 2002-132792 A | 5/2002 |
| JP | 2003-323441 A | 11/2003 |
| JP | 2004-046325 A | 2/2004 |
| JP | 2006-015757 A | 1/2006 |
| JP | 2006-260426 A | 9/2006 |
| JP | 2006-323486 A | 11/2006 |
| JP | 2008-040688 A | 2/2008 |
| JP | 2008-097404 A | 4/2008 |
| JP | 2009-098836 A | 5/2009 |
| JP | 2010-205138 A | 9/2010 |
| WO | 2006/010737 A2 | 2/2006 |

OTHER PUBLICATIONS

Co Pending U.S. Appl. No. 14/063,089, filed Oct. 25, 2013.
Co Pending U.S. Appl. No. 14/063,122, filed Oct. 25, 2013.
Feb. 5, 2015—(US) Notice of Allowance—U.S. Appl. No. 14/062,964.
Apr. 7, 2015—(US) Non-Final Office Action—U.S. Appl. No. 14/063,122.
Apr. 17, 2015—(US) Non-Final Office Action—U.S. Appl. No. 14/063,089.
Mar. 1, 2016—(JP) Notification of Reasons for Rejection—App 2012-237285, Eng Tran.
Jun. 14, 2016—(EP) Extended Search Report—App 13190351.0.
Jun. 15, 2016—(EP) Extended Search Report—App 13190353.6.
May 31, 2016—(EP) Extended Search Report—App 13190344.5.
Jun. 9, 2016—(EP) Extended Search Report—App 13190347.8.

* cited by examiner

FIG. 5

|  |  | YEAR | MONTH | DAY | HOUR | MINUTES |
|---|---|---|---|---|---|---|
| EXAMPLE 1 | START TIME T1 | 13 | 4 | 18 | 13 | 00 |
|  | END TIME T2 | 13 | 4 | 18 | 16 | 30 |
| EXAMPLE 2 | START TIME T1 | 13 | 4 | 18 | 13 | 00 |
|  | END TIME T2 |  |  |  | 16 | 30 |
| EXAMPLE 3 | START TIME T1 |  |  |  | 13 | 00 |
|  | END TIME T2 | 13 | 4 | 18 | 16 | 30 |
| EXAMPLE 4 | START TIME T1 |  | 4 | 18 | 13 |  |
|  | END TIME T2 |  |  |  | 16 |  |
| EXAMPLE 5 | START TIME T1 | 13 | 4 | 18 |  |  |
|  | END TIME T2 |  |  |  |  |  |
| EXAMPLE 6 | START TIME T1 | 13 | 4 | 18 |  |  |
|  | END TIME T2 |  | 4 | 18 | 11 |  |
| EXAMPLE 7 | START TIME T1 | 13 | 4 | 16 |  | 10 |
|  | END TIME T2 |  |  |  |  | 30 |

FIG. 11

| | | | YEAR | MONTH | DAY | HOUR | MINUTES |
|---|---|---|---|---|---|---|---|
| PROCESS 1 | EXAMPLE 1 | START TIME DT1 | 13 | 4 | 18 | 13 | 00 |
| | | END TIME T2 | 13 | 4 | 18 | 16 | 30 |
| | EXAMPLE 2 | START TIME DT1 | 13 | 4 | 18 | 13 | 00 |
| | | END TIME T2 | | | | 16 | 30 |
| | EXAMPLE 3 | START TIME DT1 | 13 | 4 | 18 | 13 | 00 |
| | | END TIME DT2 | 13 | 4 | 18 | 16 | 30 |
| | EXAMPLE 4 | START TIME DT1 | 13 | 4 | 18 | 13 | 00 |
| | | END TIME T2 | | | | 16 | |
| | EXAMPLE 5 | START TIME DT1 | 13 | 4 | 18 | 0 | 00 |
| | | END TIME T2 | | | | 23 | 59 |
| | EXAMPLE 6 | START TIME DT1 | 13 | 4 | 18 | 13 | 00 |
| | | END TIME T2 | | 4 | 18 | 11 | |
| | EXAMPLE 7 | START TIME DT1 | 13 | 4 | 16 | 12 | 10 |
| | | END TIME T2 | | | | | 30 |
| PROCESS 2 | EXAMPLE 1 | START TIME DT1 | 13 | 4 | 18 | 13 | 00 |
| | | END TIME DT2 | 13 | 4 | 18 | 16 | 30 |
| | EXAMPLE 2 | START TIME DT1 | 13 | 4 | 18 | 13 | 00 |
| | | END TIME DT2 | 13 | 4 | 18 | 16 | 30 |
| | EXAMPLE 3 | START TIME DT1 | 13 | 4 | 18 | 13 | 00 |
| | | END TIME DT2 | 13 | 4 | 18 | 16 | 30 |
| | EXAMPLE 4 | START TIME DT1 | 13 | 4 | 18 | 13 | 00 |
| | | END TIME DT2 | 13 | 4 | 18 | 16 | 00 |
| | EXAMPLE 5 | START TIME DT1 | 13 | 4 | 18 | 0 | 00 |
| | | END TIME DT2 | 13 | 4 | 18 | 23 | 59 |
| | EXAMPLE 6 | START TIME DT1 | 13 | 4 | 18 | 13 | 00 |
| | | END TIME DT2 | 13 | 4 | 18 | 11 | 00 |
| | EXAMPLE 7 | START TIME DT1 | 13 | 4 | 16 | 13 | 10 |
| | | END TIME DT2 | 13 | 4 | 16 | 15 | 30 |

FIG. 13

| | | | YEAR | MONTH | DAY | HOUR | MINUTES |
|---|---|---|---|---|---|---|---|
| SECOND EMBODIMENT | EXAMPLE 1 | START TIME DT1 | 13 | 4 | 18 | 13 | 00 |
| | | END TIME DT2 | 13 | 4 | 18 | 16 | 30 |
| | EXAMPLE 2 | START TIME DT1 | 13 | 4 | 18 | 13 | 00 |
| | | END TIME DT2 | 13 | 4 | 18 | 16 | 30 |
| | EXAMPLE 3 | START TIME DT1 | 13 | 4 | 18 | 13 | 00 |
| | | END TIME DT2 | 13 | 4 | 18 | 16 | 30 |
| | EXAMPLE 4 | START TIME DT1 | 13 | 4 | 18 | 13 | 00 |
| | | END TIME DT2 | 13 | 4 | 18 | 16 | 00 |
| | EXAMPLE 5 | START TIME DT1 | 13 | 4 | 18 | 0 | 00 |
| | | END TIME DT2 | 13 | 4 | 18 | 23 | 59 |
| | EXAMPLE 6 | START TIME DT1 | 13 | 4 | 18 | 9 | 00 |
| | | END TIME DT2 | 13 | 4 | 18 | 11 | 00 |
| | EXAMPLE 7 | START TIME DT1 | 13 | 4 | 16 | 9 | 10 |
| | | END TIME DT2 | 13 | 4 | 16 | 11 | 30 |
| PROCESSING OF MODIFIED EXAMPLE | EXAMPLE 1 | START TIME DT1 | 13 | 4 | 18 | 13 | 00 |
| | | END TIME DT2 | 13 | 4 | 18 | 16 | 30 |
| | EXAMPLE 2 | START TIME DT1 | 13 | 4 | 18 | 13 | 00 |
| | | END TIME DT2 | 13 | 4 | 18 | 16 | 30 |
| | EXAMPLE 3 | START TIME DT1 | 13 | 4 | 18 | 13 | 00 |
| | | END TIME DT2 | 13 | 4 | 18 | 16 | 30 |
| | EXAMPLE 4 | START TIME DT1 | | 4 | 18 | 13 | |
| | | END TIME DT2 | | 4 | 18 | 16 | |
| | EXAMPLE 5 | START TIME DT1 | 13 | 4 | 18 | | |
| | | END TIME DT2 | 13 | 4 | 18 | | |
| | EXAMPLE 6 | START TIME DT1 | 13 | 4 | 18 | 9 | |
| | | END TIME DT2 | 13 | 4 | 18 | 11 | |
| | EXAMPLE 7 | START TIME DT1 | 13 | 4 | 16 | | 10 |
| | | END TIME DT2 | 13 | 4 | 16 | | 30 |

INFORMATION PROCESSING APPARATUS AND MEDIUM FOR CORRECTING THE START AND END TIME DATA BASED ON HANDWRITING USER INPUT

CROSS-REFERENCE TO RELATED APPLICATION

This application claims priority to Japanese Patent Application No. 2013-087582, filed on Apr. 18, 2013, the content of which is hereby incorporated by reference.

BACKGROUND

The present disclosure relates to an information processing apparatus that is capable of acquiring text data which is identified based on stroke data input by handwriting, and to a non-transitory recording medium storing a program.

An apparatus is known in which hand-written characters are input to a tablet by an input pen and a schedule is registered. For example, an information reporting apparatus is known that is provided with columns for writing a month, a day, an hour and minutes of a start time of a schedule and with a column for writing a schedule item on a display portion of a tablet. The information reporting apparatus recognizes information written using an input pen and writes the information into a schedule table.

SUMMARY

When a schedule is registered, it is sometimes desired to input an end time in addition to a start time of the schedule. In known apparatuses, if all the units of time for the start time and the end time are not written as numerical values, there is a possibility that the start time and the end time cannot be identified.

It is an object of the present disclosure to provide an information processing apparatus and a non-transitory recording medium storing a program that are capable of appropriately setting a start time and an end time, even when, with respect to a start time and an end time that are represented by text data identified based on stroke data that is input by handwriting, some of a plurality of numerical values corresponding to each of a plurality of units of time cannot be identified.

Various embodiments provide an information processing apparatus that includes a processor and a memory. The memory stores computer-readable instructions that instruct the processor to execute steps including, acquiring start time data, acquiring end time data, first correcting the start time data by entering at least one first numerical value corresponding to a first unit, based on the end time data, when a numerical value corresponding to a unit of time cannot be identified based on the start time data with respect to at least one unit of time among a predetermined plurality of units of time that include at least a day and an hour, and second correcting the end time data by entering at least one second numerical value corresponding to a second unit, based on the start time data, when a numerical value corresponding to a unit of time cannot be identified based on the end time data with respect to at least one unit of time among the predetermined plurality of units of time. The start time data is text data that is identified based on first stroke data input by handwriting into an input field that specifies a start time of a schedule, and the end time data is text data that is identified based on second stroke data input by handwriting into an input field that specifies an end time of the schedule. The first unit is the unit of time for which the numerical value is not identified based on the start time data, and the second unit is the unit of time for which the numerical value is not identified based on the end time data.

Embodiments also provide a non-transitory recording medium storing computer-readable instructions. The instructions instruct an information processing apparatus to execute steps including, acquiring start time data, acquiring end time data, first correcting the start time data by entering at least one first numerical value corresponding to a first unit, based on the end time data, when a numerical value corresponding to a unit of time cannot be identified based on the start time data with respect to at least one unit of time among a predetermined plurality of units of time that include at least a day and an hour, and second correcting the end time data by entering at least one second numerical value corresponding to a second unit, based on the start time data, when a numerical value corresponding to a unit of time cannot be identified based on the end time data with respect to at least one unit of time among the predetermined plurality of units of time. The start time data is text data that is identified based on first stroke data input by handwriting into an input field that specifies a start time of a schedule, and the end time data is text data that is identified based on second stroke data input by handwriting into an input field that specifies an end time of the schedule. The first unit is the unit of time for which the numerical value is not identified based on the start time data, and the second unit is the unit of time for which the numerical value is not identified based on the end time data.

BRIEF DESCRIPTION OF THE DRAWINGS

Embodiments will be described below in detail with reference to the accompanying drawings in which:

FIG. 5 is a diagram showing numerical values corresponding to a year, a month, a day, an hour and minutes of a start time T1 and an end time T2 of an Example 1 to an Example 7;

FIG. 11 is a diagram showing numerical values corresponding to a year, a month, a day, an hour and minutes of a start time DT1 and the end time T2 or an end time DT2 of Example 1 to Example 7, in a Process 1 and a Process 2 of the time determination processing according to the first embodiment;

FIG. 13 is a diagram showing numerical values corresponding to the year, the month, the day, the hour and the minutes of the start time DT1 and the end time DT2 of Example 1 to Example 7, after the time determination processing according to the second embodiment or the processing of a modified example has been performed.

DETAILED DESCRIPTION

Hereinafter, a first embodiment and a second embodiment of the present disclosure will be explained with reference to the drawings. An overview of a handwriting input system 1 that is common to both the first and the second embodiments will be explained with reference to FIG. 1 to FIG. 3. First, a physical configuration of the handwriting input system 1 will be explained with reference to FIG. 1 and FIG. 2. In the following explanation, the upper left side, the lower right side, the upper side, the lower side, the upper right side and the lower left side in FIG. 1 respectively define the left side, the right side, the front side, the rear side, the upper side and the lower side of a reading device 2.

Figure 1:
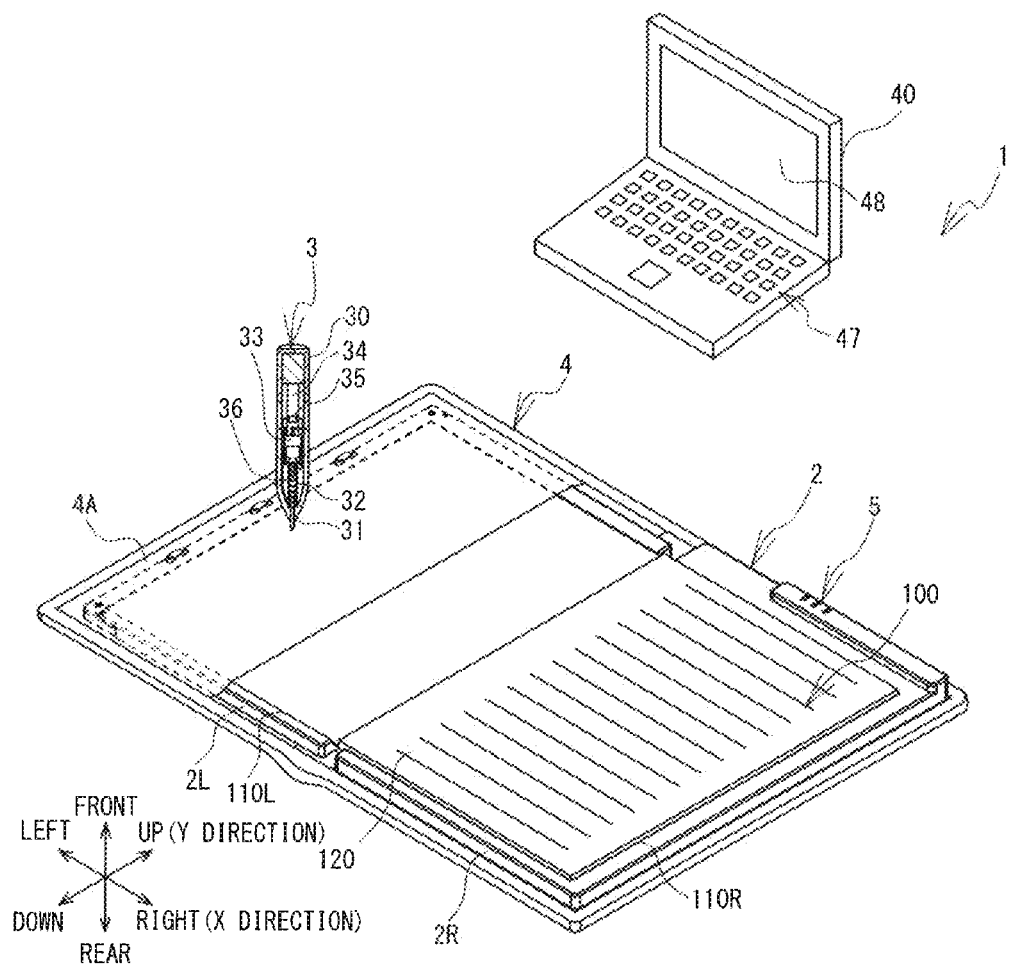
FIG. 1 is a diagram showing an overview of a handwriting input system 1.

As shown in FIG. 1, the handwriting input system 1 mainly includes the reading device 2, an electronic pen 3 and an information processing apparatus 40. The reading device 2 is a thin, lightweight handwriting input device that is portable when folded over. In the handwriting input system 1, a user uses the electronic pen 3 to write a line image on a paper sheet 120 of a paper medium 100 that is fixed to the reading device 2. The line image includes a character, a numeral, a symbol and a graphic etc. The reading device 2 detects a position of the electronic pen 3. Based on a plurality of the detected positions of the electronic pen 3 over time, the reading device 2 identifies a trajectory of the electronic pen 3. Based on data (hereinafter referred to as stroke data) of the trajectory of the electronic pen 3 identified by the reading device 2, the information processing apparatus 40 generates an image file by digitizing the line image written on the paper sheet 120 and stores the generated image file.

Figure 2:
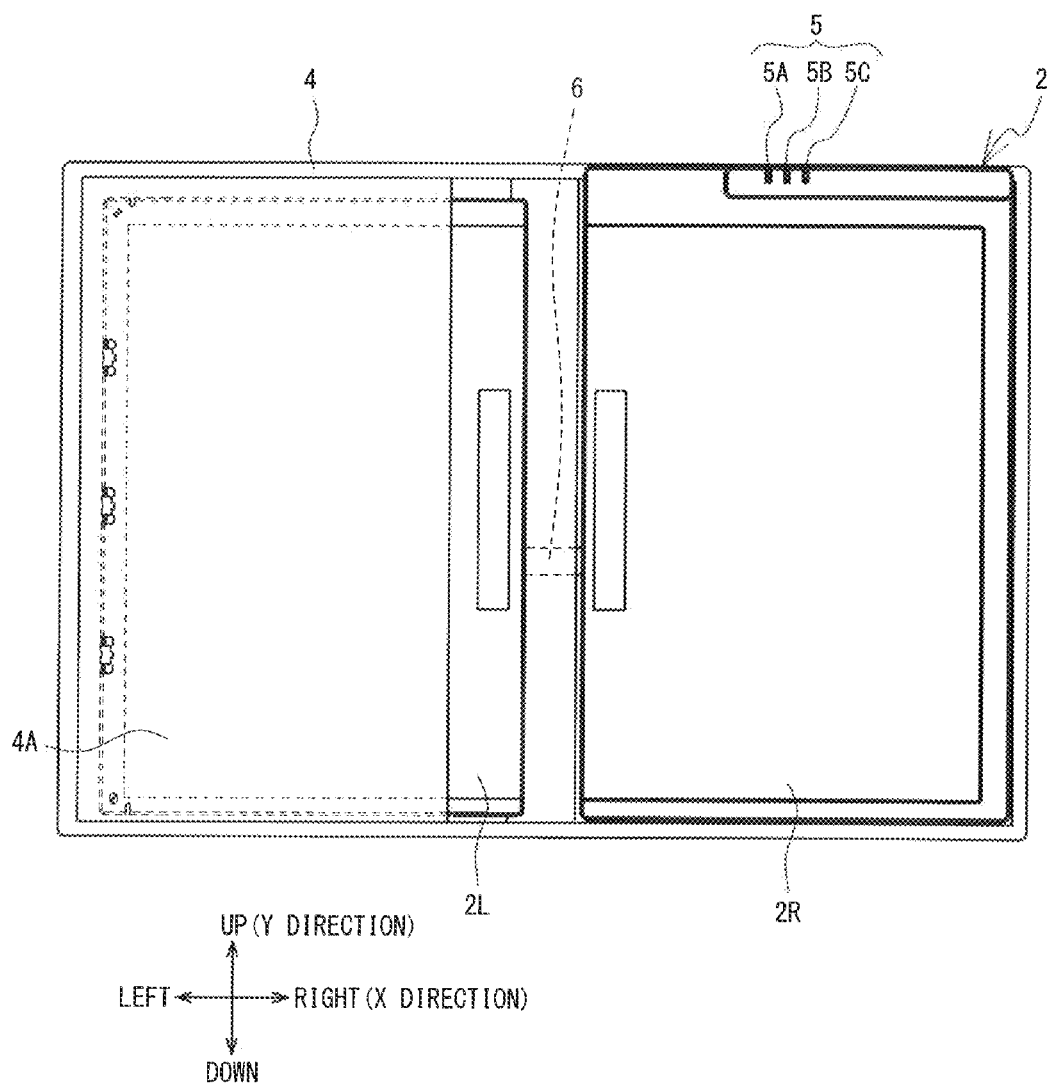
FIG. 2 is a front view of a reading device 2.

As shown in FIG. 2, a main body of the reading device 2 is configured by a pair of left and right reading apparatuses, namely, a left reading device 2L and a right reading device 2R, a flat cable 6 and a cover 4. The left reading device 2L and the right reading device 2R are a rectangular thin plate-shape, and are arranged such that they can be opened out to a two-page spread in the left-right direction on a front surface of the cover 4. The left reading device 2L and the right reading device 2R are electrically connected to the flat cable 6. Each of the left reading device 2L and the right reading device 2R is provided with a large number of long thin loop coils that are arranged in both an X direction and in a Y direction. The X direction is the left-right direction. The Y direction is the up-down direction, namely, the lengthwise direction of the left reading device 2L and the right reading device 2R. Three LEDs 5A, 5B and 5C (hereinafter collectively referred to as the "LEDs 5") are provided on an upper edge of the right reading device 2R. The LEDs 5 can notify a user of a state of the reading device 2. The cover 4 covers each of the left reading device 2L and the right reading device 2R from the rear side. A bag-shaped bag portion 4A is provided on the front left side of the cover 4. The left reading device 2L can be removably mounted on the cover 4 by being inserted into the bag portion 4A. The right reading device 2R is adhered to the front right portion of the cover 4 by double-sided adhesive tape, or by an adhesive plastic film or the like.

The paper medium 100 is removably mounted on the front surface of the reading device 2. As shown in FIG. 1, the paper medium 100 is a booklet-like medium that can be opened out to a two-page spread in the left-right direction. In the paper medium 100, a pair of cover sheets (a front cover sheet 110L and a back cover sheet 110R) and a plurality of the paper sheets 120 are respectively bound by a part of their edges. As an example, the paper medium 100 is an A5-sized notebook. A format of the paper sheet 120 differs for each type of the paper medium 100. The format of the paper sheet 120 will be explained later. The paper medium 100 is mounted on the reading device 2 such that the front cover sheet 110L is placed on the front surface of the left reading device 2L and the back cover sheet 110R is placed on the front surface of the right reading device 2R. In the present embodiment, the paper medium 100 is mounted on the reading device 2 using double-sided adhesive tape, an adhesive plastic film or the like, in a state in which the paper medium 100 has been positioned with respect to the reading device 2. In other words, each of the left reading device 2L and the right reading device 2R moves integrally with the front cover sheet 110L and the back cover sheet 110R, respectively. The user can use the electronic pen 3 to write a line image on the paper sheet 120 of the paper medium 100.

The electronic pen 3 is a known electromagnetic induction-type electronic pen, and includes a cylindrical body 30, a core body 31, a coil 32, a variable capacity condenser 33, a board 34, a condenser 35 and an ink storage portion 36. The cylindrical body 30 has a cylindrical shape and internally houses part of the core body 31, the coil 32, the variable capacity condenser 33, the board 34, the condenser 35 and the ink storage portion 36. The core body 31 is provided on the leading end portion (the rear side in FIG. 1) of the electronic pen 3. The core body 31 is urged toward the leading end of the electronic pen 3 by an elastic member that is not shown in the drawings. The leading end portion of the core body 31 protrudes to the outside of the cylindrical body 30. The rear end (the front side in FIG. 1) of the core body 31 is connected to the ink storage portion 36 in which ink is stored. The ink storage portion 36 supplies ink to the core body 31. When the user writes on the paper sheet 120 using the electronic pen 3, the line image is formed on the paper sheet 120 by the ink.

In a state in which the coil 32 is wound around the periphery of the ink storage portion 36, the coil 32 is held between the core body 31 and the variable capacity condenser 33. The variable capacity condenser 33 is fixed to the inside of the electronic pen 3 by the board 34. The condenser 35 is mounted on the board 34. The condenser 35 and the variable capacity condenser 33 are connected in parallel to the coil 32 and form a known resonance (tuning) circuit.

The information processing apparatus 40 is a general-purpose notebook type personal computer. The information processing apparatus 40 is provided with an input portion 47 and a display 48. The input portion 47 is used to input various instructions. The display 48 displays an image. In the handwriting input system 1, a known information terminal (a tablet PC, a smart phone or the like) may be used as the information processing apparatus 40 in place of the personal computer.

Figure 3:
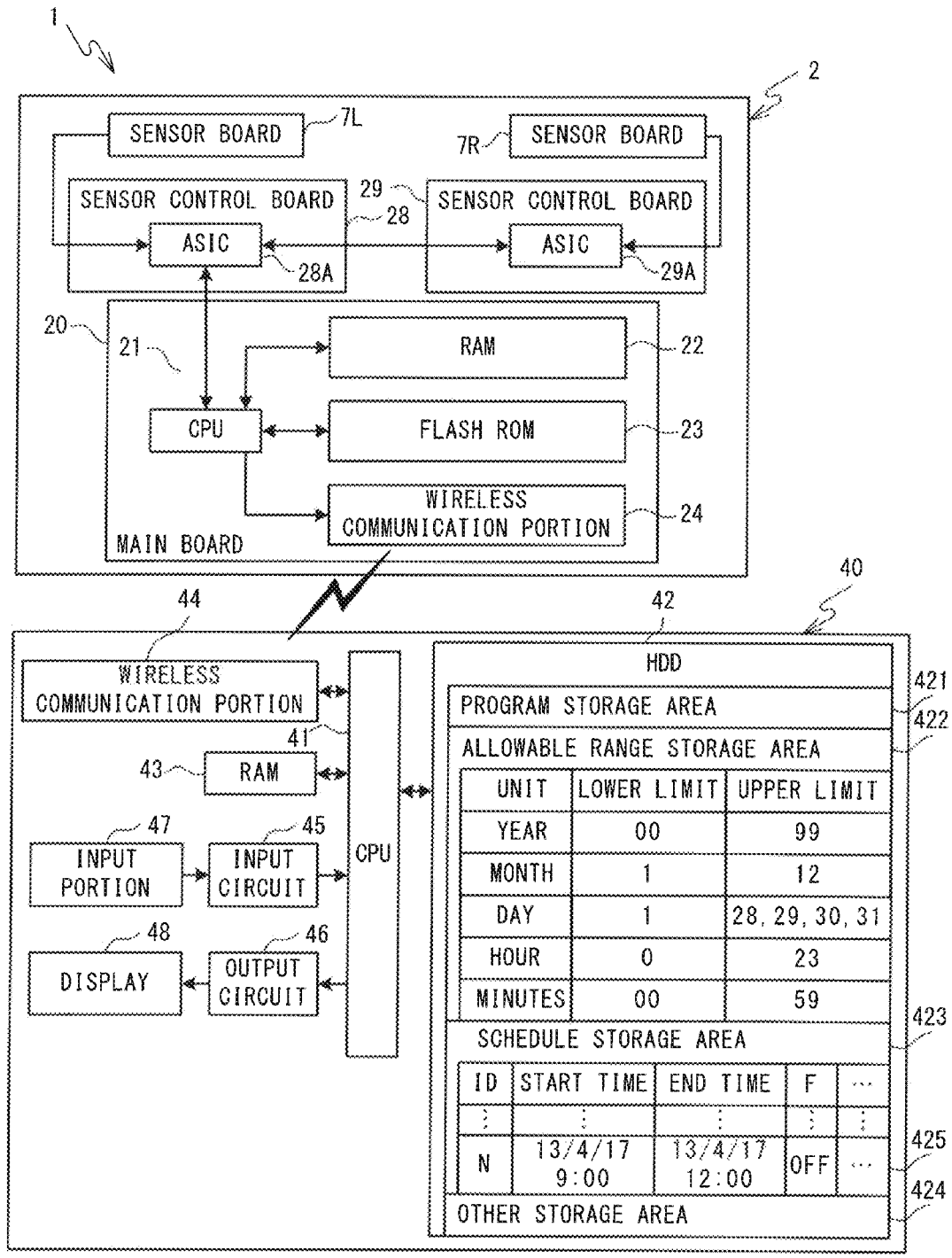
FIG. 3 is a block diagram showing an electrical configuration of the reading device 2 and an information processing apparatus 40.

An electrical configuration of the handwriting input system 1 will be explained with reference to FIG. 3. First, an electrical configuration of the reading device 2, and an overview of the principle by which the reading device 2 acquires stroke data will be explained. The reading device 2 is provided with sensor boards 7L and 7R, a main board 20 and sensor control boards 28 and 29.

The main board 20 is provided with a CPU 21, a RAM 22, a flash ROM 23 and a wireless communication portion 24. The RAM 22, the flash ROM 23 and the wireless communication portion 24 are electrically connected to the CPU 21. The CPU 21 controls the reading device 2. Various type of data, such as calculation data, are temporarily stored in the RAM 22. Various programs that are executed in order for the CPU 21 to control the information processing apparatus 40 are stored in the flash ROM 23. Further, the stroke data is stored in the flash ROM 23 in association with a time at which the stroke data is input. The wireless communication portion 24 is a controller that is used to perform near-field wireless communication with an external electronic device.

The sensor board 7L is electrically connected to an application-specific integrated circuit (ASIC) 28A of the sensor control board 28. The ASIC 28A performs processing to generate the stroke data based on a handwriting input operation when the handwriting input operation using the electronic pen 3 is performed on the sensor board 7L. The sensor board 7R is electrically connected to an ASIC 29A of the sensor control board 29. The ASIC 29A performs processing to generate the stroke data based on a handwriting input operation when the handwriting input operation using the electronic pen 3 is performed on the sensor board 7R. Of the ASIC 28A and the ASIC 29A, the ASIC 28A on the master side is directly connected to the CPU 21 and the ASIC 29A on the slave side is connected to the CPU 21 via the ASIC 28A.

The principle by which the stroke data is acquired when the handwriting input operation is performed using the electronic pen 3 on the sensor boards 7L and 7R will be briefly explained. The CPU 21 controls the ASIC 28A and the ASIC 29A and causes a current (a sending current for excitation) of a specific frequency to flow to each one of the loop coils of the sensor boards 7L and 7R. In this way, a magnetic field is generated from each of the loop coils of the sensor boards 7L and 7R. For example, if the user uses the electronic pen 3 to write the line image on the paper sheet 120 of the paper medium 100 that is fixed to the reading device 2 in this state, the electronic pen 3 comes very close to the sensor boards 7L and 7R. Thus, a resonance circuit of the electronic pen 3 resonates as a result of electromagnetic induction and an induction field is generated.

Next, the CPU 21 controls the ASIC 28A and the ASIC 29A and stops the generation of the magnetic field from the loop coils of each of the sensor boards 7L and 7R. Then, the induction field generated from the resonance circuit of the electronic pen 3 is received by the loop coils of each of the sensor boards 7L and 7R. The CPU 21 controls the ASIC 28A and the ASIC 29A and causes a signal current (a reception current) that is flowing through each of the loop coils of the sensor boards 7L and 7R to be detected. The ASIC 28A and the ASIC 29A perform this operation one by one for all of the loop coils, and the position of the electronic pen 3 is detected as coordinate information based on the reception current.

Further, in a state in which the electronic pen 3 is being used to write the line image on the paper sheet 120, a writing pressure is applied to the core body 31. The inductance of the coil 32 varies depending on the writing pressure applied to the core body 31. In this way, the resonance frequency of the resonance circuit of the electronic pen 3 changes depending on the writing pressure applied to the core body 31. The CPU 21 detects the change in the resonance frequency (a phase change) and identifies the writing pressure applied to the electronic pen 3. More specifically, the CPU 21 can determine whether the line image is being written on the paper sheet 120 of the paper medium 100 by the identified writing pressure from the electronic pen 3. When it is determined that the line image is being written on the paper sheet 120, the CPU 21 acquires, as the stroke data, the coordinate information representing the position of the electronic pen 3, and stores the acquired stroke data in the flash ROM 23.

An electrical configuration of the information processing apparatus 40, and an overview of processing when the information processing apparatus 40 receives the stroke data from the reading device 2, will be explained with reference to FIG. 3. The information processing apparatus 40 is mainly provided with a CPU 41, a hard disk drive (HDD) 42, a RAM 43, a wireless communication portion 44, an input circuit 45, an output circuit 46, the input portion 47 and the display 48. The CPU 41 controls the information processing apparatus 40. The CPU 41 is electrically connected to the hard disk drive (HDD) 42, the RAM 43, the wireless communication portion 44, the input circuit 45 and the output circuit 46.

The HDD 42 is provided with a program storage area 421, an allowable range storage area 422, a schedule storage area 423 and another storage area 424. Various programs executed by the CPU 41 are stored in the program storage area 421. Units of time and allowable ranges of numerical values corresponding to the units of time are stored in association with each other in the allowable range storage area 422. The units of time are units of measure representing a time, and in the present embodiment, a year, a month, a day, an hour and minutes are set as the units of time. The numerical values corresponding to the year in the present embodiment are represented by the last two digits of the western calendar, 00 to 99. The numerical values corresponding to the month are represented by 1 digit or 2 digit numerical values from 1 to 12. The numerical values corresponding to the day are represented by 1 digit or 2 digit numbers from 1 to 31. The numerical values corresponding to the hour are represented by 1 digit or 2 digit numbers from 0 to 23. The numerical values corresponding to the minute are represented by 1 digit or 2 digit numbers from 00 to 59. A schedule that is identified based on the stroke data acquired from the reading device 2 is stored in the schedule storage area 423. Items that are included in the schedule include an ID, start time data (a start time), end time data (an end time) and an all-day schedule flag (F). In FIG. 3, with respect to numerical values representing the start time data (the start time) and the end time data (the end time), the year, the month and the day are separated by slashes and the hour and minutes are separated by colons. The ID represents an order in which the schedule is stored in the schedule storage area 423. Various other data are stored in the another other storage area 424.

The information processing apparatus 40 is provided with a medium reading device (a CD-ROM drive, for example) that is not shown in the drawings. The information processing apparatus 40 can read programs that are stored in a storage medium (a CD-ROM, for example) using the medium reading device, and can install the programs in the HDD 42. Alternatively, the information processing apparatus 40 may receive programs from an external device (not shown in the drawings) that is connected to the information processing apparatus 40 or from a network and install the programs in the HDD 42.

Various temporary data is stored in the RAM 43. The wireless communication portion 44 is a controller that is used to perform near-field wireless communication with the external electronic device. The input circuit 45 performs control to transmit instructions from the input portion 47 (which is, for example, a mouse, a keyboard or a touch panel) to the CPU 41. The output circuit 46 performs control to display an image on the display 48 in accordance with an instruction from the CPU 41.

The overview of the processing when the information processing apparatus 40 acquires the stroke data from the reading device 2 will be explained. When an instruction is input by the user to acquire the stroke data from the reading device 2, the CPU 41 performs near-field wireless communication with the reading device 2 via the wireless communication portion 44. The stroke data that is saved in the flash ROM 23 of the reading device 2 is transferred to the information processing apparatus 40. The CPU 41 stores the stroke data transferred from the reading device 2 in the RAM 43. The stroke data may be transferred to the information processing apparatus 40 from the reading device 2 by wired communication.

The CPU 41 identifies, by optical character recognition (OCR) processing, a character string that is formed by a trajectory represented by the stroke data stored in the RAM 43. Note that the character string includes characters, numerals, symbols and graphics etc. that are represented by character code that can be recognized by the information processing apparatus 40. There are not only cases in which a plurality of characters, numerals, symbols and graphics etc. are identified, but also cases in which one character, one numeral, one symbol or one graphic etc. is identified. The CPU 41 provisionally generates image data representing the trajectory that is represented by the stroke data, and identifies the character string by performing the OCR processing on the provisionally generated image data. The method for identifying the character string from the trajectory represented by the stroke data may be changed as appropriate. For example, the CPU 41 may use known pattern matching technology to directly identify the character string from the stroke data.

A format 70 of the paper sheet 120 of the paper medium 100 will be explained with reference to FIG. 4. The format 70 is a format for writing one or more schedules that are arranged on a page of the paper sheet 120. In a state in which the paper medium 100 is in an open two-page spread state on the left reading device 2L and the right reading device 2R of the reading device 2, the schedule may be arranged on both the left and right pages. In the paper medium 100, a plurality of the paper sheets 120 on which the same format 70 is printed may be bound together, or a plurality of types of format that are mutually different to the format 70 may be printed on the paper sheets 120. In the present embodiment, a design is printed on the rear surface of the front cover sheet 110L of the paper medium 100 that causes the reading device 2 to recognize the format of the paper sheet 120 bound in the paper medium 100. The reading device 2 can identify the format of the paper sheet 120 based on a handwriting input operation using the electronic pen 3 on the rear surface of the front cover sheet 110L. The reading device 2 distinguishes an arrangement of input fields depending on the format, and performs the processing to generate the stroke data input by handwriting.

The format 70 includes input fields 71 to 83 and a check box 84. Line images relating to the schedule are written in the input fields 71 to 83. More specifically, a title of the schedule is written in the input field 71. Numerical values corresponding to a year, month, day, hour and minutes of a start time are respectively written in the input fields 72 to 76. Numerical values corresponding to a year, month, day, hour and minutes of an end time are respectively written in the input fields 77 to 81. A location at which the schedule is to be held is written in the input field 82. Details (an explanation) of the schedule are written in the input field 83. When the stroke data representing the line images written on the format 70 is to be stored in the flash ROM 23, a check mark is written in the check box 84.

When the line image is written on the format 70, the CPU 21 of the reading device 2 acquires the stroke data and stores the acquired stroke data, the input field and an input time in association with each other in the RAM 22. When the CPU 21 detects that the check mark has been written in the check box 84, the CPU 21 causes the stroke data stored in the RAM 22 and the input time to be stored in the flash ROM 23 in association with each other. The input time may be stored for each input field, or may be a value that is common to each of the input fields. As described above, the CPU 41 of the information processing apparatus 40 acquires the stroke data, the input field and the input time from the reading device 2 and stores them in the RAM 43.

Time determination processing that is performed by the information processing apparatus 40 of the first and the second embodiments will be briefly explained. The information processing apparatus 40 of the first embodiment and the information processing apparatus 40 of the second embodiment each perform the time determination processing shown in FIG. 6. As will be explained in more detail later, a reference time is different in the time determination processing of the first embodiment and the time determination processing of the second embodiment. In the time determination processing, start time data is acquired. The start time data is text data that is identified based on first stroke data that is written by hand in the input fields 72 to 76, specifying the start time of the schedule, by the user using the format 70. Similarly, end time data is acquired. The end time data is text data that is identified based on second stroke data that is written by hand in the input fields 77 to 81, specifying the end time of the schedule.

As specific examples, cases in which text data of an Example 1 to an Example 7 are obtained as shown in FIG. 5 will be assumed. In Example 1 and Example 2, with respect to a start time T1 that is identified based on the start time data, numerical values are set for all of units of time, among specific units of time. In the present embodiment, the specific units of time are the year, the month, the day, the hour and the minutes. In Example 3 to Example 7, of the year, the month, the day, the hour and the minutes, in at least one of the units of time, the numerical value corresponding to the unit of time is not set. In this type of case, for each of first units, the CPU 41 of the information processing apparatus 40 corrects the start time data by entering a first numerical value corresponding to the first unit, based on the end time data. The first unit is the time unit for which the numerical value has not been identified based on the start time data. The first numerical value is a numerical value corresponding to the first unit. When the information processing apparatus 40 cannot correct the start time data based on the end time data, the information processing apparatus 40 corrects the start time data based on the reference time. The reference time of the first embodiment is an input time, and the reference time of the second embodiment is latest start time data. The input time is a time at which the first stroke data is input by handwriting. The stored latest start time data is the data for which the time being stored is most recent, among the start time data stored in the schedule storage area 423 of the HDD 42.

In a similar manner, in Example 2 and Example 4 to Example 7, with respect to an end time T2 that is identified based on the end time data, the numerical value corresponding to the unit of time is not set in at least one of the specific units of time. In this type of case, for each of second units, the CPU 41 of the information processing apparatus 40 corrects the end time data by entering a second numerical value corresponding to the second unit, based on the start time data. The second unit is the time unit for which the numerical value has not been identified based on the end time data. The second numerical value is a numerical value corresponding to the second unit.

Time Determination Processing of First Embodiment

Figure 6:
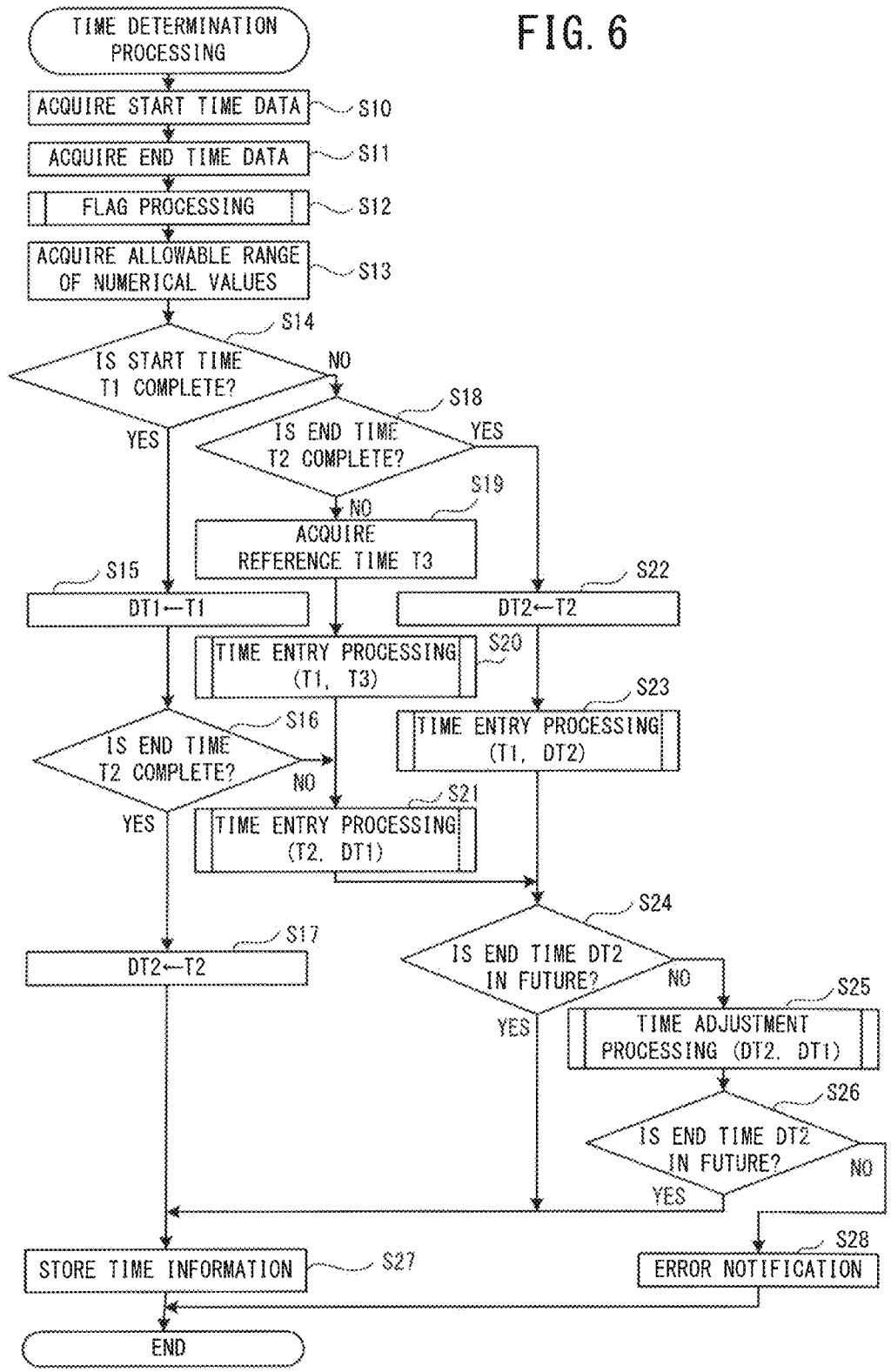
FIG. 6 is a flowchart of time determination processing.

The time determination processing of the first embodiment will be explained with reference to FIG. 5 to FIG. 11. The time determination processing shown in FIG. 6 is activated when processing that determines the schedule, based on the text data identified based on the stroke data, is started. When the CPU 41 detects that an instruction to start the time determination processing has been input, the program to execute the time determination processing, which is stored in the program storage area 421 of the HDD 42 shown in FIG. 3, is read into the RAM 43 and processing at each of steps that are explained hereinafter is performed in accordance with instructions included in the program. It is assumed that various data obtained in the course of the processing are stored in the RAM 43 as necessary. Hereinafter, step is abbreviated as S. As specific examples, an explanation will be given of cases in which the text data of Example 1 to Example 7 shown in FIG. 5 are obtained.

As shown in FIG. 6, the CPU 41 acquires the start time data (S10). The CPU 41 respectively sets, as variables TYear, TMonth, TDay, THour and TMin of the start time T1, numerical values corresponding to the year, the month, the day, the hour and the minutes of a start time T1 that is identified based on the acquired start time data. In Example 1, numerical values 13, 4, 18, 13 and 00 are respectively set as the variables TYear, TMonth, TDay, THour and TMin of the start time T1. Similarly, the CPU 41 acquires the end time data (S11). The CPU 41 respectively sets, as variables TYear, TMonth, TDay, THour and TMin of the end time T2, numerical values corresponding to the year, the month, the day, the hour and the minutes of the end time T2 that is identified based on the acquired end time data. In Example 1, numerical values 13, 4, 18, 16 and 30 are respectively set as the variables TYear, TMonth, TDay, THour and TMin of the end time T2.

Figure 7:
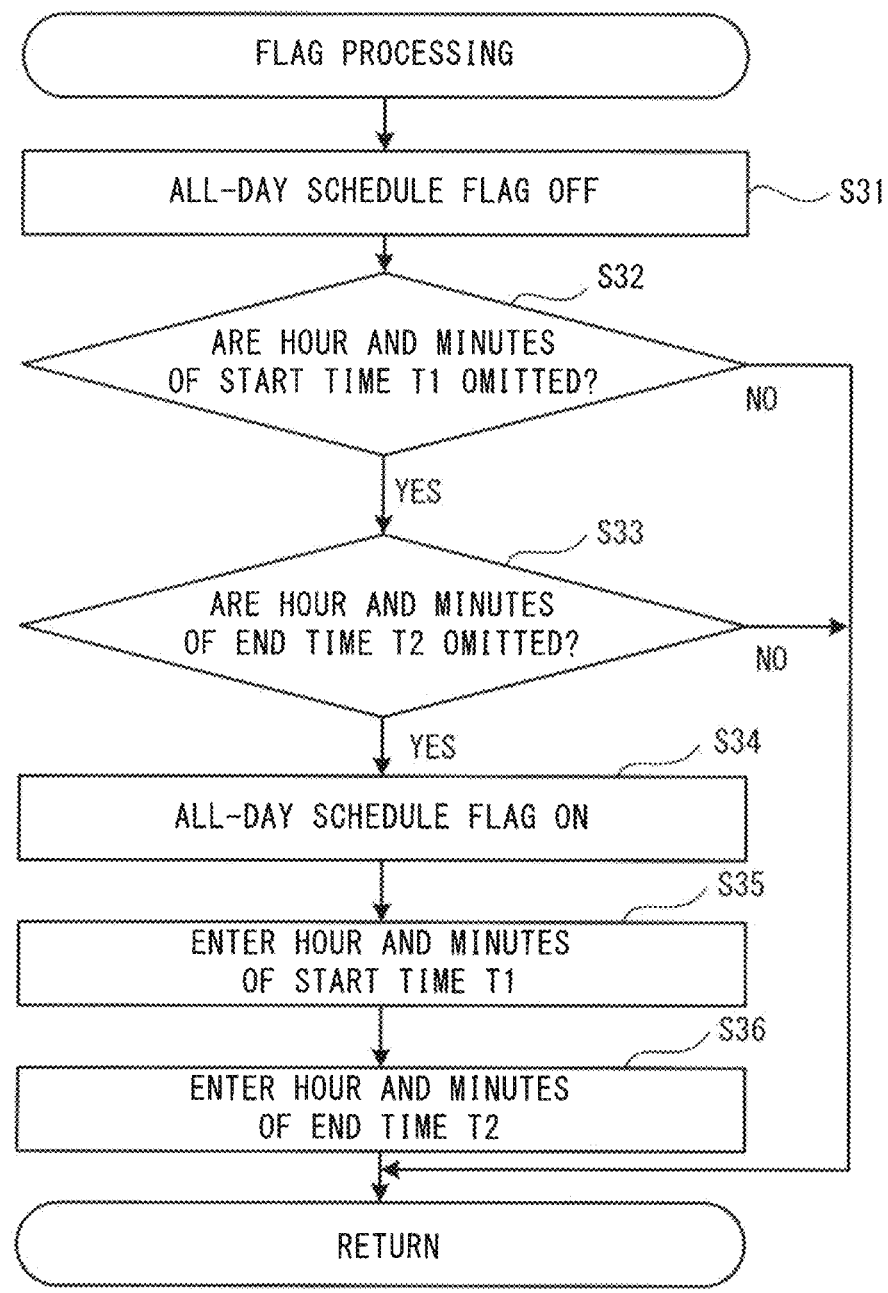
FIG. 7 is a flowchart of flag processing that is performed in the time determination processing shown in FIG. 6.

The CPU 41 performs flag processing (S12). In the flag processing, processing is performed to set an all-day schedule flag. The all-day schedule flag indicates whether the schedule that is input by handwriting on the format 70 shown in FIG. 4 is an all-day schedule. More specifically, as shown in FIG. 7, the CPU 41 sets the all-day schedule flag to OFF (S31). The fact that the all-day schedule flag is OFF indicates that the schedule input by handwriting on the format 70 is not the all-day schedule. Based on the start time data acquired at S10 in FIG. 6, the CPU 41 determines whether the hour and minutes of the start time T1 are omitted (S32). In Example 1 to Example 4 and in Example 7, a numerical value is set for at least one of THour and TMin of the start time T1 (no at S32). In this case, the CPU 41 ends the flag processing and returns the processing to the time determination processing shown in FIG. 6. In Example 5 and Example 6, numerical values are not set for THour and TMin of the start time T1 (yes at S32). In this case, based on the end time data acquired at S11 in FIG. 6, the CPU 41 determines whether the hour and minutes of the end time T2 are omitted (S33). In Example 6, a numerical value is set for THour of the end time T2 (no at S33). In this case, the CPU 41 ends the flag processing and returns the processing to the time determination processing shown in FIG. 6.

In Example 5, numerical values are not set for THour and TMin of the end time T2 (yes at S33). In this case, the CPU 41 sets the all-day schedule flag to ON (S34). The fact that the all-day schedule flag is ON indicates that the schedule input by handwriting on the format 70 is the all-day schedule. The CPU 41 enters the hour and minutes of the start time T1 and the hour and minutes of the end time T2 using a specific value (S35, S36). The specific value may be a time that is determined in advance and stored in the storage medium. For example, in the present embodiment, as shown by numerical values in cells that are shaded by diagonal lines in a Process 1 column shown in FIG. 11, 0 is entered as THour and 00 is entered as TMin of the start time T1, and 23 is entered as THour and 59 is entered as TMin of the end time T2. As another example, 8 is entered in THour and 00 is entered in TMin of the start time T1, and 17 is entered in THour and 00 is entered in TMin of the end time T2, based on a working start time (8:00, for example) and a working end time (17:00, for example). As another example, a NULL value is entered in THour and TMin of the start time T1 and in THour and TMin of the end time T2. The CPU 41 ends the flag processing and returns the processing to the time determination processing shown in FIG. 6.

Next in processing at S12 in FIG. 6, the CPU 41 refers to the allowable range storage area 422 of the HDD 42 and acquires an allowable range of each the numerical values corresponding to the units of time used to indicate the start time or the end time (S13). The CPU 41 refers to the start time data acquired at S10 and determines whether the start time T1 is complete (S14). When the start time T1 includes all the numerical values corresponding to each of the units of time, and each of the numerical values falls within the allowable range acquired in the processing at S13, the CPU 41 determines that the start time T1 is complete. Specifically, when the start time T1 is complete, it means that all the units of time of the start time T1 are not the first unit. In the processing at S14, the numerical values are set for all the variables TYear, TMonth, TDay, THour and TMin of the start time T1 of Example 1, Example 2 and Example 5 and each of the numerical values falls within the allowable range (yes at S14). In Example 5, before the processing at S12 is performed, numerical values are not set in THour and TMin of the start time T1. However, the numerical value of the hour and minutes of the start time T1 is filled in the processing at S35 of the flag processing shown in FIG. 7, and thus, at S14, it is determined that the start time T1 includes all the numerical values corresponding to each of the units of time.

In these cases, the CPU 41 sets a start time DT1 as the start time T1 (S15). The start time DT1 is a start time that is represented by the start time data that has been corrected as necessary in the time determination processing. Numerical values corresponding to the year, month, day, hour and minutes of the start time DT1 are set as each of variables DYear, DMonth, DDay, DHour and DMin of the start time DT1. In the present embodiment, when the start time T1 is complete, the variables TYear, TMonth, TDay, THour and TMin of the start time T1 are set, respectively, as the variables DYear, DMonth, DDay, DHour and DMin of the start time DT1.

The CPU 41 refers to the end time data acquired at S11 and determines whether the end time T2 is complete (S16). When the end time T2 includes all the numerical values corresponding to each of the units of time, and each of the numerical values falls within the allowable range acquired in the processing at S13, the CPU 41 determines that the end time T2 is complete. Specifically, when the end time T2 is complete, it means that all the units of time of the end time T2 are not the second unit. The numerical values are set for all the variables TYear, TMonth, TDay, THour and TMin of the end time T2 in Example 1, and each of the numerical values falls within the allowable range (yes at S16). In this case, the CPU 41 sets the end time T2 as an end time DT2 (S17). The end time DT2 is an end time that is represented by the end time data that has been corrected as necessary in the time determination processing. Numerical values corresponding to the year, month, day, hour and minutes of the end time DT2 are set as each of variables DYear, DMonth, DDay, DHour and DMin of the end time DT2. In the present embodiment, when the end time T2 is complete, the variables TYear, TMonth, TDay, THour and TMin of the end time T2 are set, respectively, as the variables DYear, DMonth, DDay, DHour and DMin of the end time DT2. The CPU 41 stores the start time data, the end time data and the all-day schedule flag as time information of the schedule in the schedule storage area 423 of the HDD 42 (S27) and ends the time determination processing.

In Example 3, Example 4, Example 6 and Example 7, some of the numerical values corresponding to each of the units of time are not set for the start time T1 (no at S14). In this case, in the same manner as S16, the CPU 41 refers to the end time data and determines whether the end time T2 is complete (S18). The numerical values are set for all the variables TYear, TMonth, TDay, THour and TMin of the end time T2 in Example 3, and each of the numerical values falls within the allowable range (yes at S18). In this case, similarly to the processing at S17, the CPU 41 sets the end time DT2 as the end time T2 (S22). The CPU 41 performs time entry processing (T1, DT2).

Some of the numerical values corresponding to each of the units of time are omitted from the end time T2 in Example 4, Example 6 and Example 7 (no at S18). In this case, after acquiring a reference time T3 (S19), the CPU 41 performs the time entry processing (T1, T3) (S20). The reference time T3 is a time other than the end time T2, and is a reference used in processing that writes the first numerical value into the first unit of the start time T1. As described above, the reference time T3 of the first embodiment is an input time. The input time in the present embodiment is associated with stroke data of the input fields 72 to 76 and is stored in the RAM 43. A specific example of the input time is 16 Apr. 2013, 12:55.

The time entry processing (X, Y) is processing in which, for the start time T1 and the end time T2, a numerical value based on a standard time ST is entered into the unit of time for which the numerical value has been omitted. An argument X is a value that is used to set a target time, which is the time that is targeted by the processing. When X is T1, this indicates that the target time is the start time T1. When the value of the argument X is T2, this indicates that the target time is the end time T2. An argument Y is a value that is used to set the standard time ST. When Y is DT1, this indicates that the standard time ST is the start time DT1. When Y is DT2, this indicates that the standard time ST is the end time DT2. When Y is T3, this indicates that the standard time ST is the reference time T3. The processing at S23 is the time entry processing (T1, DT2), and processing is performed in which the first numerical value is entered into the first unit of the start time T1, using the end time DT2 as the standard time ST. The processing at S20 is the time entry processing (T1, T3) and processing is performed in which the first numerical value is entered into the first unit of the start time T1, using the reference time T3 as the standard time ST.

Figure 8:
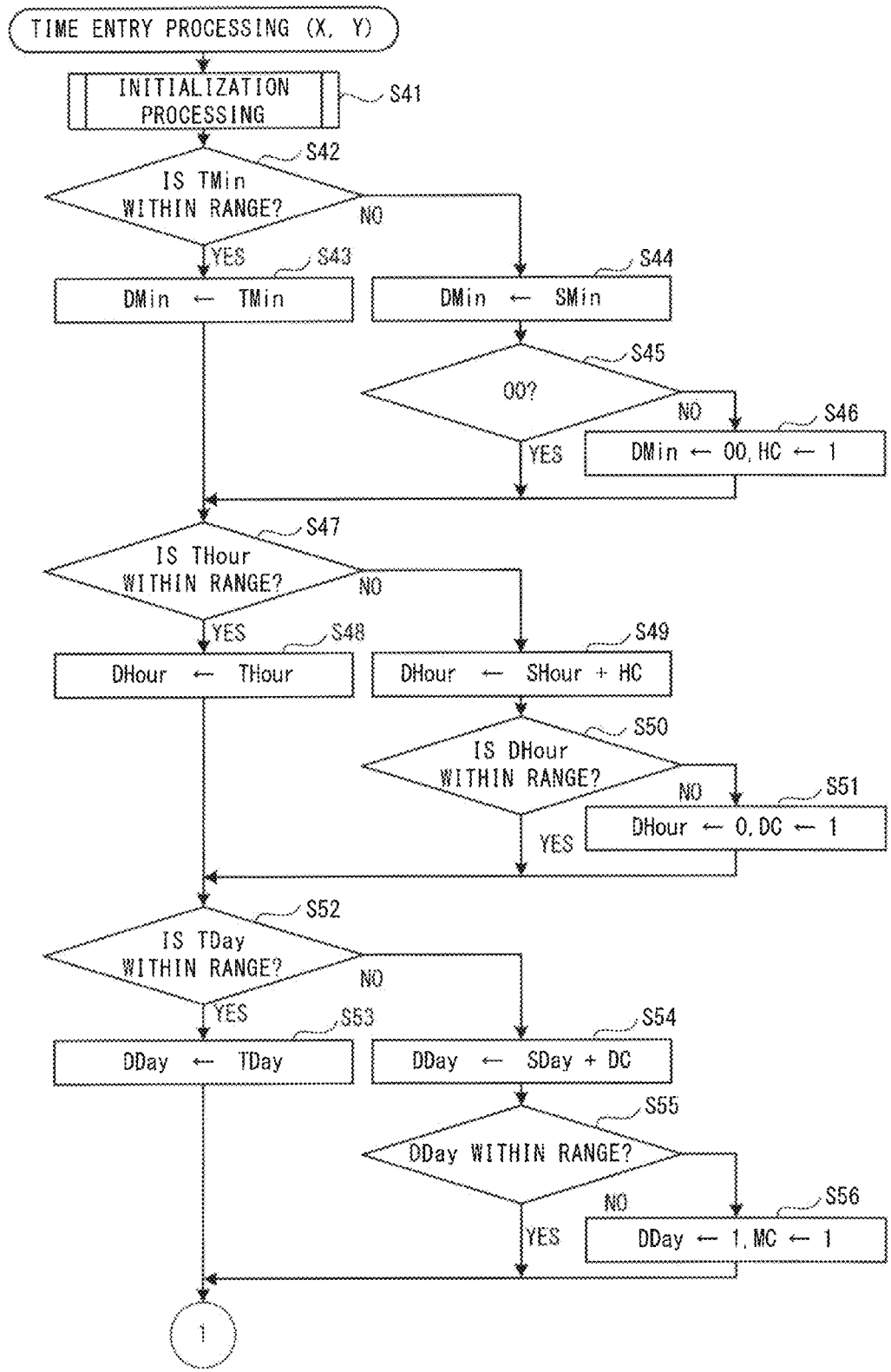
FIG. 8 is a flowchart of time entry processing (X, Y) that is performed in the time determination processing shown in FIG. 6.
Figure 9:
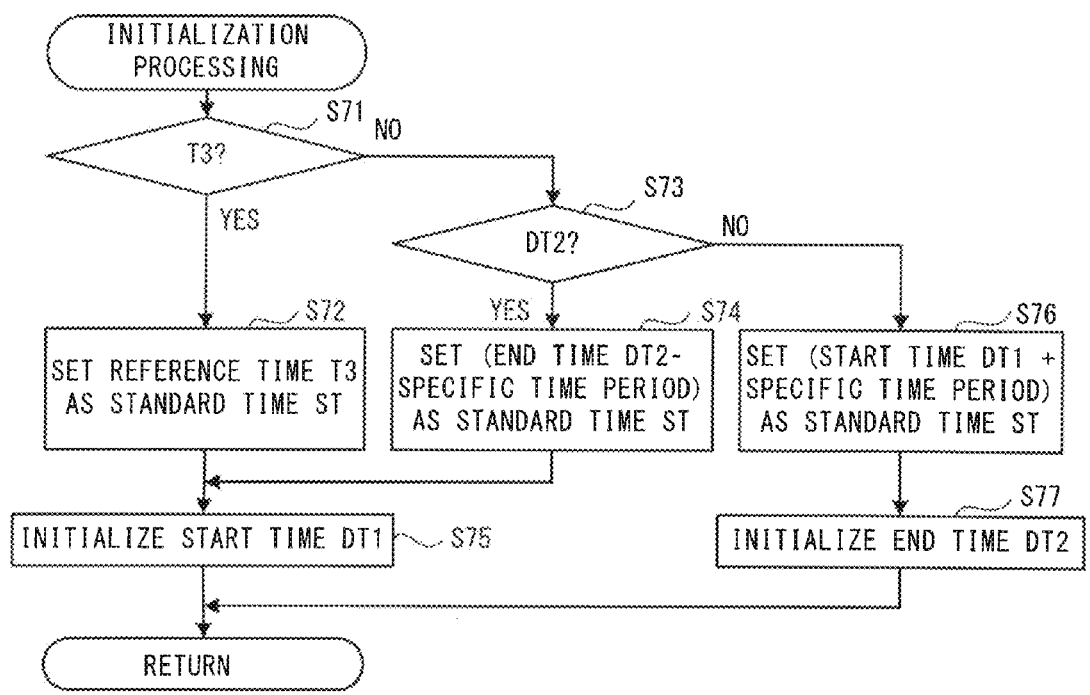
FIG. 9 is a flowchart of initialization processing that is performed in the time entry processing (X, Y) shown in FIG. 8.

The time entry processing (X, Y) will be explained with reference to FIG. 8. As shown in FIG. 8, in the time entry processing (X, Y), the CPU 41 first performs initialization processing (S41). In the initialization processing, processing is performed to set the target time and the standard time ST depending on values of X and Y. More specifically, as shown in FIG. 9, as Y is T3 in Example 4, Example 6 and Example 7 (yes at S71), the CPU 41 sets 16 Apr. 2013, 12:55 as the standard time ST, which is the input time (S72). In the processing at S72, the numerical values 13, 4, 16, 12 and 55 corresponding to the year, month, day, hour and minutes of the standard time ST are set, respectively, as variables SYear, SMonth, SDay, SHour and SMin of the standard time ST.

In Example 3, Y is DT2 (no at S71, yes at S73) and therefore, the CPU 41 sets a time obtained by subtracting a specific time period from the end time DT2 as the standard ST (S74). The specific time period may be set in advance and stored in a storage medium such as the HDD 42 until the time determination processing is performed, and in the present embodiment, the specific time period is 2 hours. In Example 3, the end time DT2 is 18 Apr. 2013, 16:30 and the standard time ST is 18 Apr. 2013, 14:30. The numerical values 13, 4, 18, 14 and 30 corresponding to the year, month, day, hour and minutes of the standard time ST are set, respectively, as the variables SYear, SMonth, SDay, SHour and SMin of the standard time ST. Following the processing at S72 and S74, the CPU 41 sets the variables DYear, DMonth, DDay, DHour and DMin corresponding to each of the units of time (the year, the month, the day, the time and the minutes) of the determined start time DT1 to 0 (S75). The CPU 41 sets variables HC, DC, MC and YC that are used in the time entry processing (X, Y) to 0.

When Y is DT1 (no at S71, no at S73), the CPU 41 sets a time that is obtained by adding a specific time period to the start time DT1 as the standard time ST. The specific time period may be set in advance and stored in a storage medium such as the HDD 42 until the time determination processing is performed, and in the present embodiment, the specific time period is 2 hours. The specific time period of the processing at S76 may be the same as the specific time period of the processing at S74, or the specific time periods may be mutually different. The CPU 41 sets the variables DYear, DMonth, DDay, DHour and DMin corresponding to each of the units of time (the year, the month, the day, the time and the minutes) of the end time DT2 to 0 (S77). The CPU 41 sets variables HC, DC, MC and YC that are used in the time entry processing (X, Y) to 0. After the processing at S75 or S77, the CPU 41 returns the processing to the time entry processing (X, Y) shown in FIG. 8.

After S41 of FIG. 8, the CPU 41 determines whether the variable TMin of the target time is within the allowable range (S42). Based on the allowable range acquired in the processing at S13 of FIG. 6, when the variable TMin is equal to or greater than 0 and equal to or less than 59, the CPU 41 determines that the variable TMin is within the allowable range. When the numerical value is not set as the variable TMin, or when the variable TMin is less than 0 or equal to or greater than 60, the CPU 41 determines that the variable TMin is not within the allowable range. In Example 3, the variable TMin of the start time T1 is 00 and in Example 7, the variable TMin of the start time T1 is 10 (yes at S42). In these cases, the CPU 41 sets the variable TMin of the target time as the variable DMin (S43).

In Example 4 and Example 6, the numerical value is not set as the variable TMin of the start time T1 (no at S42). In other words, the minutes that are part of the units of time of the start time T1 are the first unit. In this case, the CPU 41 sets the variable SMin of the standard time ST as the variable DMin (S44). In Example 4 and Example 6, the standard time ST is the input time, and 55 is set as the variable DMin. The CPU 41 determines whether the value of the variable DMin is 00 (S45). The processing at S45 is processing to set the numerical value corresponding to the minutes of the start time or the end time of the schedule to 00, which is a convenient cutoff time. In Example 4 and Example 6, the value of the variable DMin is 55, and is not 00 (no at S45). In this case, the CPU 41 sets 00 as the variable DMin and sets 1 as the variable HC (S46).

When the variable DMin is 00 (yes at S45), or after S43 or after S46, the CPU 41 determines whether the variable THour of the target time is within the allowable range (S47). Based on the allowable range acquired at S13 of FIG. 6, when the variable THour is equal to or greater than 0 and equal to or less than 23, the CPU 41 determines that the variable THour is within the allowable range. When the numerical value is not set as the variable THour, or when the variable THour is less than 0 or equal to or greater than 24, the CPU 41 determines that the variable THour is not within the allowable range. In Example 3 and Example 4, the variable THour of the start time T1 is 13 (yes at S47). In these cases, the CPU 41 sets 13, which is the variable THour of the start time DT1, as the variable DHour (S48).

In Example 6 and Example 7, the numerical value is not set as the variable THour of the start time T1 (no at S47). In other words, the hour that is part of the units of time of the start time T1 is the first unit. In this case, the CPU 41 sets, as the variable DHour, a value obtained by adding the variable HC to the variable SHour of the standard time ST (S49). In Example 6, the standard time ST is the input time and the variable HC is 1. Thus, in Example 6, in the processing at S49, 13 is set as the variable DHour. In Example 7, the standard time ST is the input time and the variable HC is 0. Thus, in Example 7, in the processing at S49, 12 is set as the variable DHour. Similarly to the processing at S47, the CPU 41 determines whether the variable DHour is within the allowable range (S50). The processing at S50 is processing to correct the numerical value, when the numerical value corresponding to the hour of the start time or the end time of the schedule is a value that extends beyond a single day. When the variable DHour is not within the allowable range (no at S50), the CPU 41 sets 0 as the variable DHour and sets 1 as the variable DC (S51).

When the variable DHour is within the allowable range (yes at S50), as in Example 6 and Example 7, or after S48 or S51, the CPU 41 determines whether the variable TDay of the target time is within the allowable range (S52). Based on the allowable range acquired in the processing at S13 of FIG. 6, when the variable TDay is equal to or greater than 1 and is equal to or less than a numerical value of a last day, the CPU 41 determines that the variable TDay is within the allowable range. The numerical value of the last day is determined depending on the month of the target time or on the month of the standard time, and is one of values 28, 29, 30 or 31. When the numerical value is not set as the variable TDay, or when the variable TDay is less than 1 or is a numerical value greater than the numerical value of the last day, the CPU 41 determines that the variable TDay is not within the allowable range. In Example 4 and Example 6, the variable TDay of the start time T1 is 18 and in Example 7, the variable TDay of the start time T1 is 16 (yes at S52). In these cases, the CPU 41 sets the variable TDay of the start time T1 as the variable DDay (S53).

In Example 3, the numerical value is not set as the variable TDay of the start time T1 (no at S52). In other words, the day that is part of the units of time of the start time T1 is the first unit. In this case, the CPU 41 sets, as the variable DDay, a value obtained by adding the variable DC to the variable SDay of the standard time ST (S54). In Example 3, the standard time ST is a time obtained by subtracting a specific time period from the end time DT2 and the variable DC is 0. Thus, in Example 3, in the processing at S54, 18 is set as the variable DDay. Similarly to the processing at S52, the CPU 41 determines whether the variable DDay is within the allowable range (S55). The processing at S55 is processing to correct the numerical value, when the day of the time of the schedule is a numerical value that extends over into a following month. When the variable DDay is not within the allowable range (no at S55), the CPU 41 sets 1 as the variable DDay and sets 1 as the variable MC (S56).

Figure 10:
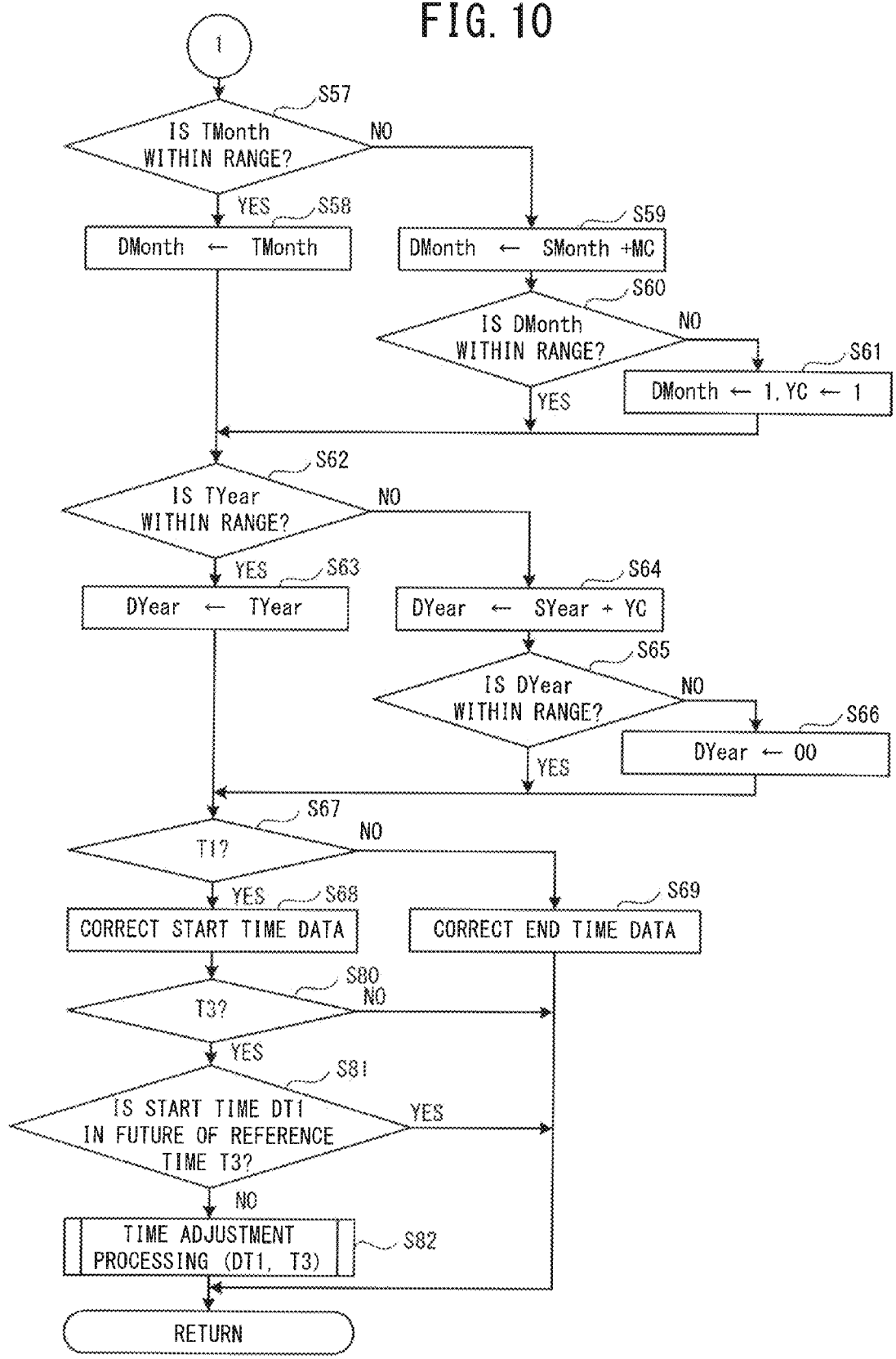
FIG. 10 is a flowchart of the time entry processing (X, Y)

When the variable DDay is within the allowable range, as in Example 3 (yes at S55), or after S53 or S56, the CPU 41 determines whether the variable TMonth of the target time is within the allowable range, based on the allowable range acquired at the processing at S13 of FIG. 6, as shown in FIG. 10 (S57). When the variable TMonth is equal to or greater than 1 and is equal to or less than 12, the CPU 41 determines that the variable TMonth is within the allowable range. When the numerical value is not set as the variable TMonth, or when the variable TMonth is less than 1 or equal to or greater than 13, the CPU 41 determines that the variable TMonth is not within the allowable range. In Example 4, Example 6 and Example 7, the variable TMonth of the start time T1 is 4 (yes at S57). In these cases, the CPU 41 sets the variable TMonth of the start time T1 as the variable DMonth (S58).

In Example 3, the numerical value is not set as the variable TMonth of the start time T1 (no at S58). In other words, the month that is part of the units of time of the start time T1 is the first unit. In this case, the CPU 41 sets, as the variable DMonth, a value obtained by adding the variable MC to the variable SMonth of the standard time ST (S59). In Example 3, the standard time ST is a time obtained by subtracting the specific time period from the end time DT2 and the variable MC is 0. Thus, in Example 3, in the processing at S59, 4 is set as the variable DMonth. Similarly to the processing at S57, the CPU 41 determines whether the variable DMonth is within the allowable range (S60). The processing at S60 is processing to correct the numerical value, when the numerical value corresponding to the month of the start time or the end time of the schedule extends over into a following year. When the value of the variable DMonth is not within the allowable range (no at S60), the CPU 41 sets 1 as the variable DMonth and sets 1 as the variable YC (S61).

When the variable DMonth is within the allowable range (yes at S60), as in Example 3, or after S58 or S61, the CPU 41 determines whether the variable TYear of the target time is within the allowable range, based on the allowable range acquired in the processing at S13 of FIG. 6 (S62). When the variable TYear is equal to or greater than 00 and is equal to or less than 99, the CPU 41 determines that the variable TYear is within the allowable range. When the numerical value is not set as the variable TYear, or when the variable TYear is less than 0 or equal to or greater than 100, the CPU 41 determines that the variable TYear is not within the allowable range. In Example 6 and Example 7, the variable TYear of the start time T1 is 13 (yes at S62). In these cases, the CPU 41 sets 13, which is the variable TYear of the start time T1, as the variable DYear (S63).

In Example 3 and Example 4, the numerical value is not set as the variable TYear of the start time T1 (no at S62). In other words, the year that is part of the units of time of the start time T1 is the first unit. In this case, the CPU 41 sets, as the variable DYear, a value obtained by adding the variable YC to the variable SYear of the standard time ST (S64). In Example 3, the standard time ST is a time obtained by subtracting the specific time period from the end time DT2 and the variable YC is 0. Thus, in Example 3, in the processing at S64, 13 is set as the variable DYear. In Example 4, the standard time ST is the input time, and the variable YC is 0. Thus, in Example 4, in the processing at S64, 13 is set as the variable DYear. Similarly to the processing at S62, the CPU 41 determines whether the variable DYear is within the allowable range (S65). The processing at S65 is processing to correct the numerical value to a 2 digit numerical value, when the year of the start time or the end time of the schedule is a numerical value of 3 digits. When the variable DYear is not within the allowable range (no at S65), the CPU 41 sets 00 as the variable DYear (S66).

When the variable DYear is within the allowable range (yes at S65), as in Example 3 and Example 4, or after S63 or S66, the CPU 41 determines whether X is T1 (S67). When X is T2 (no at S67), the CPU 41 sets each of the variables DYear, DMonth, DDay, DHour and DMin as the end time DT2, and corrects the end time data (S69). By the processing at S69, the second numerical values are entered into the second units, and the end time data is corrected. The CPU 41 ends the time entry processing (X, Y), and returns the processing to the time determination processing shown in FIG. 6.

When X is T1 (yes at S67), the CPU 41 sets each of the variables DYear, DMonth, DDay, DHour and DMin as the start time DT1, and corrects the start time data (S68). By the processing at S68, the start time data is corrected in a state in which the first numerical values are entered in the first units, as exemplified by the columns in Process 1 shown in FIG. 11. In FIG. 11, the numerical values of cells that are shaded by fine vertical lines indicate the first numerical values that are entered by the processing at S23. The numerical values of cells shaded by a diagonal grid formation indicate the first numerical values that are entered by the processing at S20. The CPU 41 determines whether Y is T3 (S80). In Example 3 in which the time entry processing (T1, DT2) is performed at S23, Y is DT2 (no at S80). In this case, the CPU 41 ends the time entry processing (X, Y) and returns the processing to the time determination processing shown in FIG. 6.

In Example 4, Example 6 and Example 7 in which the time entry processing (X, Y) is performed at S20, Y is T3 (yes at S80). In these cases, the CPU 41 determines whether the start time DT1 is a time in the future of the reference time T3 (S81). As shown in the columns of Process 1 in FIG. 11, the start time DT1 in Example 4 and Example 6 is a time in the future of the input time (yes at S81). In these cases, the CPU 41 ends the time entry processing (X, Y) and returns the processing to the time determination processing shown in FIG. 6. The start time DT1 in Example 7 is 16 Apr. 2013, 12:10, which is in the past of the input time 16 Apr. 2013, 12:55 (no at S81). In this case, the CPU 41 performs time adjustment processing (DT1, T3) (S82).

The time adjustment processing (V, W) is processing that adjusts an adjustment time, which is a time that is an adjustment target, such that the adjustment time is in the future of a comparison time, which is a time that is a comparison target, and thereby corrects the adjustment time. An argument V is a value that is used to set the adjustment time. When V is DT1, the adjustment time is the start time DT1 and data of the adjustment time is the start time data. When V is DT2, the adjustment time is the end time DT2 and the data of the adjustment time is the end time data. An argument W is a value that is used to set the comparison time. When W is T3, the comparison time is the reference time T3. When W is DT1, the comparison time is the start time DT1.

Figure 12:
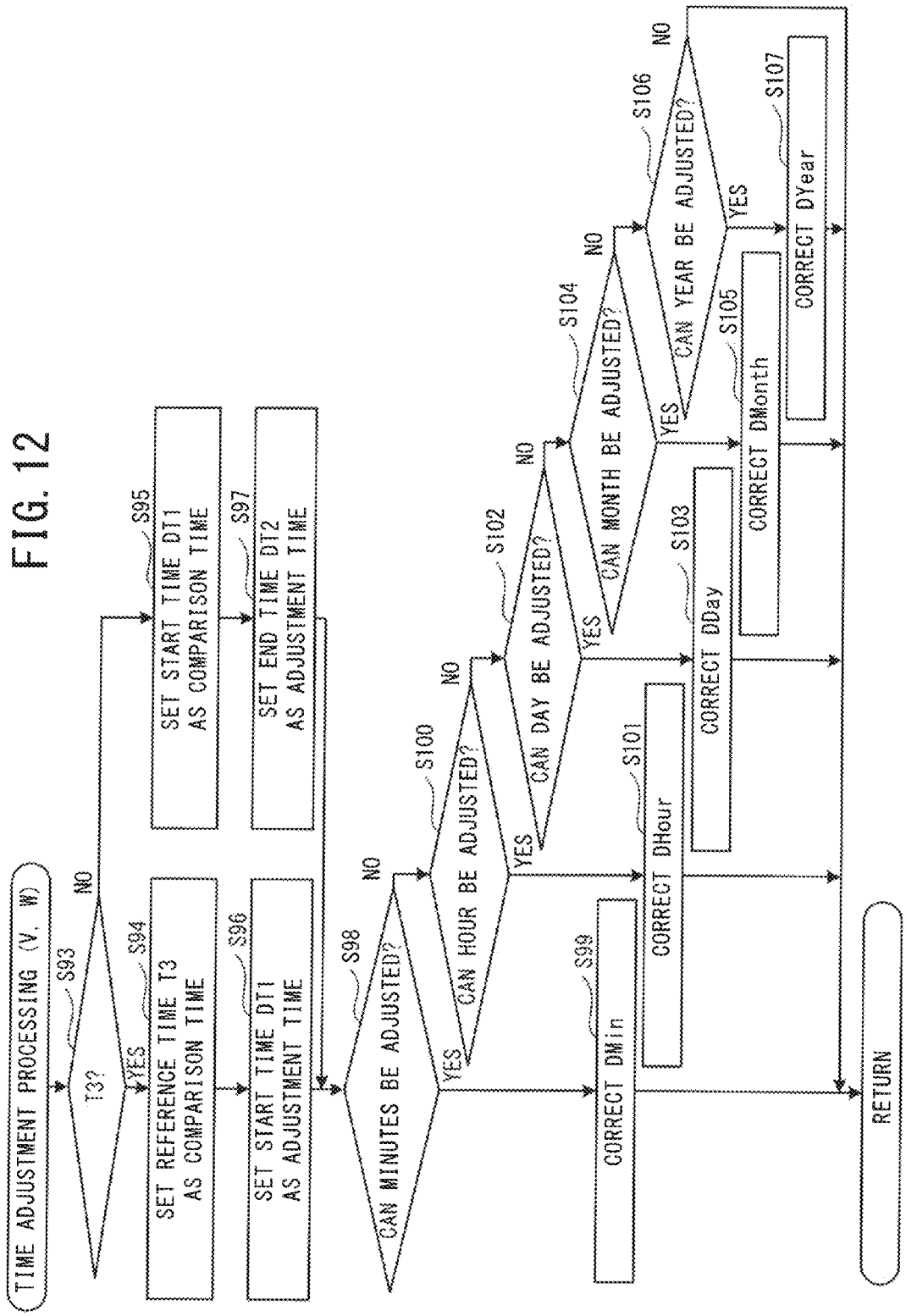
FIG. 12 is a flowchart of time adjustment processing (V, W) that is performed in the time determination processing shown in FIG. 6 or in the time entry processing (X, Y) shown in FIG. 8.

As shown in FIG. 12, in the time adjustment processing (V, W), when W is T3 (yes at S93), the CPU 41 sets the reference time T3 as the comparison time (S94). In the first embodiment, the reference time T3 is the input time. The CPU 41 sets the start time DT1 as the adjustment time (S96). When W is DT1 (no at S93), the CPU 41 sets the start time DT1 as the comparison time (S95). The CPU 41 sets the end time DT2 as the adjustment time (S97).

After S95 or S97, the CPU 41 determines whether the variable DMin of the adjustment time can be adjusted (S98). When the variable DMin of the adjustment time is a value that has been set based on the variable SMin of the standard time ST and it is possible to set the adjustment time as a time in the future of the comparison time by adjusting the variable DMin of the adjustment time, the CPU 41 determines that the variable DMin of the adjustment time can be adjusted. In the present embodiment, as long as the numerical value identified based on the stroke data input by handwriting by the user falls within the allowable range, the value is not changed. Specifically, when the variable DMin of the adjustment time is a value set based on the variable TMin of the target time, the variable DMin is not adjusted. When the variable DMin of the adjustment time is a value set based on the standard time ST and it is possible to set the adjustment time as a time in the future of the comparison time by adjusting the variable DMin of the adjustment time (yes at S98), the CPU 41 corrects the variable DMin of the adjustment time and corrects the data of the adjustment time (S99). The method for correcting the numerical value may be established in advance. For example, a minimum value by which the time of the adjustment time is in the future of the comparison time within the allowable range may be set as the variable DMin. As another example, numerical values 15, 30 or 45 etc. that have been specified in advance, to which the time can be easily rounded, may be set as the variable DMin such that the adjustment time is a time in the future of the comparison time.

The variable DMin of the start time DT1 in Example 7 is not the value set based on the variable SMin of the standard time ST (no at S98). In this case, the CPU 41 determines whether the variable DHour of the adjustment time can be adjusted (S100). When the variable DHour of the adjustment time is a value set based on the variable SHour of the standard time ST and it is possible to set the adjustment time as a time in the future of the comparison time by adjusting the variable DHour of the adjustment time, the CPU 41 determines that the variable DHour of the adjustment time can be adjusted. The variable DHour of the start time DT1 in Example 7 is the value set based on the variable SHour of the standard time ST and it is possible to set the adjustment time to a time in the future of the comparison time by setting the variable DHour as 13, for example (yes at S100). In this case, the CPU 41 corrects the variable DHour of the adjustment time such that the adjustment time is a time in the future of the comparison time and corrects the data of the adjustment time (S101). Similarly to S99, the method of adjusting the numerical value may be established in advance. In the present embodiment, in Example 7, 13 is set as the minimum value by which the time of the adjustment time is in the future of the comparison time within the allowable range.

When the variable DHour of the adjustment time cannot be adjusted (no at S100), the CPU 41 determines whether the variable DDay of the adjustment time can be adjusted (S102). When the variable DDay of the adjustment time is a value set based on the variable SDay of the standard time ST and it is possible to set the adjustment time as a time in the future of the comparison time by adjusting the variable DDay of the adjustment time, the CPU 41 determines that the variable DDay of the adjustment time can be adjusted (yes at S102). In this case, the CPU 41 corrects the variable DDay of the adjustment time such that the adjustment time is a time in the future of the comparison time and corrects the data of the adjustment time (S103). Similarly to S99, the method of adjusting the numerical value may be established in advance.

When the variable DDay of the adjustment time cannot be adjusted (no at S102), the CPU 41 determines whether the variable DMonth of the adjustment time can be adjusted (S104). When the variable DMonth of the adjustment time is a value set based on the variable SMonth of the standard time ST and it is possible to set the adjustment time as a time in the future of the comparison time by adjusting the variable DMonth of the adjustment time, the CPU 41 determines that the variable DMonth of the adjustment time can be adjusted (yes at S104). In this case, the CPU 41 corrects the variable DMonth of the adjustment time such that the adjustment time is a time in the future of the comparison time and corrects the data of the adjustment time (S105). Similarly to S99, the method of adjusting the numerical value may be established in advance.

When the variable DMonth cannot be adjusted (no at S104), the CPU 41 determines whether the variable DYear of the adjustment time can be adjusted (S106). When the variable DYear of the adjustment time is a value set based on the variable SYear of the standard time ST and it is possible to set the adjustment time as a time in the future of the comparison time by adjusting the variable DYear of the adjustment time, the CPU 41 determines that the variable DYear of the adjustment time can be adjusted (yes at S106). In this case, the CPU 41 corrects the variable DYear of the adjustment time such that the adjustment time is a time in the future of the comparison time and corrects the data of the adjustment time (S107). Similarly to S99, the method of adjusting the numerical value may be established in advance.

When the variable DYear of the adjustment time cannot be adjusted (no at S106), or after the processing at S99, S101, S103, S105 or S107, the CPU 41 ends the time adjustment processing (V, W) and returns the processing to the time entry processing (X, Y) shown in FIG. 10. After S82 shown in FIG. 10, the CPU 41 ends the time entry processing (X, Y) and returns the processing to the time determination processing shown in FIG. 6.

At S15 shown in FIG. 6, when the end time T2 is not complete (no at S16), or after the processing at S20, the CPU 41 performs the time entry processing (T2, DT1) (S21). At S21, the time entry processing (X, Y) is performed with the end time T2 as the target time and the start time DT1 as the standard time ST. By the processing at S21, as shown by cells shaded by bold vertical lines in columns in Process 2 shown in FIG. 11, the second numerical values are entered in the second units and the end time data is corrected.

After S21 or S23, the CPU 41 determines whether the end time DT2 is in the future of the start time DT1 (S24). In Example 1 to Example 5 and in Example 7, the end time DT2 is in the future of the start time DT1 (yes at S24). In these cases, the CPU 41 performs the processing at S27 described above.

In Example 6, the end time DT2 is in the past of the start time DT1 (no at S24). In this case, the CPU 41 performs the time adjustment processing (DT2, DT1) and adjusts the end time DT2 such that it is in the future of the start time DT1 (S25). When the end time DT2 has been adjusted such that it is in the future of the start time DT1 by the processing at S25 (yes at S26), the above-described processing at S27 is performed. In Example 6, when the time adjustment processing (DT2, DT1) is performed, DYear of the end time DT2 is adjusted to 14. In other words, by the processing at S25, the end time DT2 in Example 6 becomes in the future of the start time DT1 (yes at S26). When the end time DT2 is not adjusted to be in the future of the start time DT1 (no at S26), the CPU 41 performs notification of an error (S28). For example, the CPU 41 outputs an instruction to the output circuit 46 and displays an error message on the display 48. The error message reads, for example, "The start time or the end time cannot be identified." In this case, the start time data and the end time data are returned to the values at S10 or at S11, and the time information is not stored in the schedule storage area 423 of the HDD 42. After the processing at S27 or S28, the CPU 41 ends the time determination processing.

When there is no input in some of the input fields 72 to 76 of the start time on the format 70, the information processing apparatus 40 enters the first value in the first unit that has not been input (S21). The information processing apparatus 40 does not change the numerical values of the input fields of the start time that can be identified based on the start time data, and uses the end time data to enter only the numerical values of the input fields that cannot be identified based on the start time data. As a result, the information processing apparatus 40 is able to automatically enter numerical values that have not been input by handwriting in relation to the start time, while prioritizing a hand-written input result. Similarly, when there is no input in some of the input fields 77 to 81 of the end time, the second value is entered in the second unit that has not been input (S22). The information processing apparatus 40 does not change the numerical values of the input fields of the end time that can be identified based on the end time data, and uses the start time data to enter only the numerical values of the input fields that cannot be identified based on the end time data. As a result, the information processing apparatus 40 is able to automatically enter numerical values that have not been input by handwriting that represent the end time, while prioritizing the hand-written input result. Thus, with respect to the start time and the end time that are represented by the text data identified based on the stroke data that is input by handwriting, even when some of the plurality of numerical values corresponding to each of the plurality of units of time are not identified, the information processing apparatus 40 can appropriately set all of the plurality of numerical values corresponding to each of the plurality of units of time.

Even when the information processing apparatus 40 cannot correct the start time T1 represented by the start time data based on the end time T2, the information processing apparatus 40 can correct the start time data by taking the input time at which the stroke data is input by the user's handwriting as the standard time ST. Even when the input time and the current time are significantly different, the information processing apparatus 40 can correct the start time data based on the input time from which the user can predict the start time data after the correction. Further, by performing the processing at S81 and S82 shown in FIG. 10, the information processing apparatus 40 can set the start time DT1 such that the start time DT1 is a time in the future of the input time.

As shown in FIG. 12, by adjusting the numerical values in order from the units of time that are smaller in scale, the information processing apparatus 40 can simplify the processing to set the start time further in the future than the input time. The format 70 is provided with the input fields corresponding to each of the 5 units of time that are the year, the month, the day, the hour and the minutes. Each of the start time and the end time has the 5 units of time and it is therefore necessary for the user to input a total of 10 numerical values by handwriting. Of the numerical values of the 10 input fields, the information processing apparatus 40 enters the numerical values that have been omitted or the numerical values that have not been identified. As a result, with the information processing apparatus 40, it is possible to reduce the number of numerical values that are needed to specify the year, the month, the day, the hour and the minutes of the start time and the end time to a number less than 10. In this way, with the information processing apparatus 40, it is possible to simplify the operation by the user to specify the start time and the end time of the schedule.

In general, there are many cases in which the end time of the schedule is set for a specific time period after the start time of the schedule. The information processing apparatus 40 can set the time of the specific time period after the start time as the standard time ST and can correct the end time data. By performing the processing at S42, S47 and S52 shown in FIG. 8, and the processing at S57 and S62 shown in FIG. 10, the information processing apparatus 40 can avoid a situation in which the numerical values that are outside the allowable range from being used as they are in the processing to determine the start time or the end time etc. The information processing apparatus 40 performs the flag processing shown in FIG. 7. Thus, by omitting the input of the hour and the minutes on the format 70, the user can cause the information processing apparatus 40 to switch the all-day schedule flag from off to on. In other words, in the information processing apparatus 40 it is possible to specify whether the schedule is the all-day schedule without increasing the input fields on the format 70.

Time Determination Processing of Second Embodiment

Time determination processing of the second embodiment will be explained. The time determination processing of the second embodiment is the same as the time determination processing of the first embodiment in that it is performed in accordance with the flowchart shown in FIG. 6. The time determination processing of the second embodiment is different to the time determination processing of the first embodiment in that, in the second embodiment, the reference time T3 is a latest start time LDT1, which is the time stored most recently among the start times DT1 stored in the schedule storage area 423 of the HDD 42.

At S19 of the time determination processing of the second embodiment, the start time DT1 stored in the schedule storage area 423 of the HDD 42 shown in FIG. 6 is acquired, namely, 17 Apr. 2013, 9:00 that is the latest start time LDT1 included in latest data 425 is acquired. As described above, in the present embodiment, the time at which the data having the largest ID is input is the most recent data. In the processing at S20, the latest start time LDT1 is used as T3.

When the text data of Example 1 to Example 7 shown in FIG. 5 are obtained, by the time determination processing of the second embodiment, each of the start times DT1 and the end times DT2 are determined as shown in a column of the second embodiment in FIG. 13. The method of displaying the cells that are shaded in the column of the second embodiment shown in FIG. 13 is the same as in the first embodiment shown in FIG. 11. In other words, the numerical values of cells that are shaded by diagonal lines are numerical values entered by the processing at S12. The numerical values of cells shaded using a diagonal grid formation are numerical values that are entered by the processing at S20. The numerical values of cells that are shaded using bold vertical lines are numerical values that are entered by the processing at S21. The numerical values of cells that are shaded using fine vertical lines are numerical values that are entered by the processing at S23.

There are cases in which, when inputting by handwriting a plurality of schedules that are continuous, for example, the user may wish to omit the input of a numerical value corresponding to the unit of time that is shared with the immediately previous input schedule. In this type of case, the information processing apparatus 40 can enter the above-described shared numerical value corresponding to the unit of time in the first unit, based on latest start time data.

The information processing apparatus of the present disclosure is not limited to the above-described embodiments, and various modifications may be applied insofar as they do not depart from the spirit and scope of the present disclosure. For example, modified examples (1) to (5) below may be applied as appropriate.

(1) The configuration of the handwriting input system 1 may be changed as appropriate. The configuration of the reading device 2 that acquires the stroke data may be changed as appropriate. For example, the reading device 2 is provided with the two sensor boards 7L and 7R, but the number of the sensor boards may be one or may be three or more. The reading device 2 causes the magnetic field to be generated from each of the loop coils of the sensor boards 7L and 7R, and the resonance circuit of the electronic pen 3 is caused to resonate by electromagnetic induction. However, with a type of the electronic pen 3 that incorporates a battery, the resonance circuit of the electronic pen 3 need not necessarily be caused to resonate by electromagnetic induction. The reading device 2 can detect the writing pressure of the electronic pen 3, but the reading device 2 need not necessarily be able to detect the writing pressure and may cause a detection result that does not take the writing pressure into account to be stored in the storage device, such as the flash ROM 23. The electrical configuration of the reading device 2 may be changed as appropriate. The reading device 2 may detect the position of the electronic pen 3 using a method other than electromagnetic induction. For example, the reading device 2 may be provided with a touch panel. It is preferable that the driving method of the touch panel is a resistance film method. In this case, the paper medium 100 may be placed on top of the touch panel.

The CPU 21 may detect the position at which the writing pressure is applied via the touch panel when the writing operation is performed by which the electronic pen 3 writes the information on the paper sheet 120 of the paper medium 100. The reading device 2 is provided separately from the information processing apparatus 40 but the information processing apparatus 40 may be provided with the functions of the reading device 2.

(2) The processing that generates the start time data and the end time data based on the stroke data may be performed by the information processing apparatus 40 or may be performed by the reading device 2. When the input time is not used as the reference time, the stroke data and the input time need not necessarily be associated with each other and stored.

Figure 4:
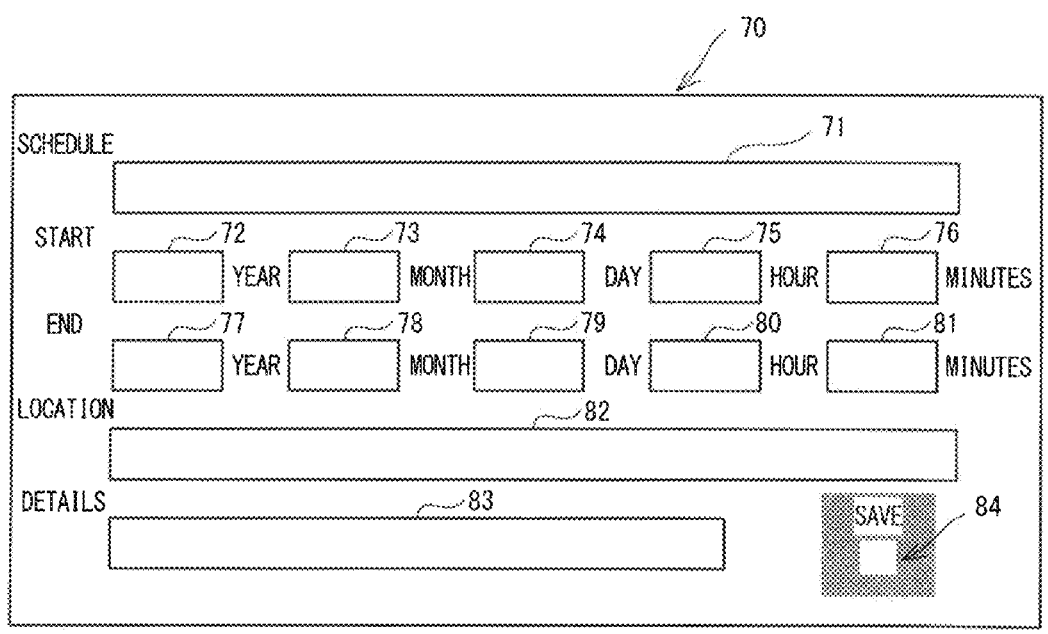
FIG. 4 is an explanatory diagram of a format 70.

(3) The format that is used to input the schedule is not limited to the format 70 shown in FIG. 4. The input fields included in the format 70 may be changed as appropriate. In the format 70, the five input fields 72 to 76 are provided as the input fields corresponding to the start time, but the present disclosure is not limited to this example. For example, as the input fields corresponding to the start time, a first input field may be provided for input by handwriting of the year, month and day separated by slashes, and a second input field may be provided for input by handwriting of the hour and minutes separated by a colon. In this case, 18 Apr. 2013, 13:00 is input as follows: 13/4/18 is input by handwriting in the first input field and 13:00 is input by handwriting in the second input field. In this case, the information processing apparatus 40 may identify the numerical values of each of the units of time based on the existence or lack of the separating symbols. In another example, it may be sufficient that the plurality of units of time representing the start time or the end time of the schedule include at least the day and time.

(4) The program including the instructions that perform the time determination processing shown in FIG. 6 and the data may be stored in a storage device provided in the information processing apparatus 40 until the information processing apparatus 40 executes the program. Thus, a method of acquisition of the program and the data, an acquisition path and each of apparatuses storing the program may be changed as appropriate. The program that is executed by a processor provided in the information processing apparatus 40 and the data may be received from another device via a cable or via wireless communication, and may be stored in a storage device such as a flash memory. The other device is, for example, a PC or a server that is connected via a network.

(5) Each of the steps of the time determination processing shown in FIG. 6 are not limited to being performed by the CPU 41 as exemplified above, and some or all of the steps may be performed by another electronic device (an ASIC, for example). Further, each of the steps of the above-described time determination processing may be distributed and processed by a plurality of electronic apparatuses (a plurality of CPUs, for example). In addition, an order of each of the steps of the time determination processing of the above-described embodiments may be changed, or the steps may be omitted or added, as necessary. Further, a case in which an operating system (OS) or the like that is operating in the information processing apparatus 40 performs part or all of actual processing based on an instruction from the CPU 41 provided in the information processing apparatus 40 and the functions of the above-described embodiment are realized by the processing, is also included in the scope of the present disclosure. For example, the following modified examples shown in (5-1) to (5-5) may be applied as appropriate.

(5-1) In the time determination processing of the first embodiment and the second embodiment shown in FIG. 6, when the start time T1 is complete (yes at S14) and the end time T2 is not complete (no at S16), the second numerical value is entered in the second unit of the end time T2, based on the start time T1 (S21). Further, when the start time T1 is not complete (no at S14) and the end time T2 is complete (yes at S18), the first numerical value is entered in the first unit of the start time T1, based on the end time T2. However, when the start time T1 is not complete and the end time T2 is not complete, the start time T1 may be taken as the standard time and the second numerical value entered in the second unit of the end time T2, or the end time T2 may be taken as the standard time and the first numerical value entered in the first unit of the start time T1. In this case, for example, for the year, the month, the day and the minutes, the numerical values of the standard time may be used as they are, and the numerical value corresponding to the hour of the start time T1 may be entered such that it is at a specific time period (2 hours, for example) with respect to the numerical value corresponding to hour of the end time T2. When the text data of Example 1 to Example 7 shown in FIG. 5 are obtained, by the processing according to the modified example, each of the start times T1 and the end times T2 is entered as shown by a column of processing of the modified example shown in FIG. 13. The numerical values of cells shaded with a diagonal grid formation in the column of the processing of the modified example in FIG. 13 are numerical values that are entered by the processing of the modified example. In the processing of the modified example only, there are cells in which numerical values are not set. In this case, the time determination processing shown in FIG. 6 may be performed after the processing of the modified example.

(5-2) The second numerical value is entered based on a time that is a specific time period after the start time DT1, but the method of setting the specific time period may be changed as appropriate. For example, the CPU 41 may set a representative value of a difference between start times and end times of the schedules stored in the schedule storage area 423 of the HDD 42 as the specific time period. The representative value is, for example, an average value, a mean value, a maximum value and a minimum value. In another example, a difference between the start time and the end time of a schedule stored most recently in the schedule storage area 423 of the HDD 42 may be set as the specific time period.

(5-3) When the first numerical value of the start time T1 cannot be entered based on the end time T2, it is entered based on the reference time T3, but the present disclosure is not limited to this example. For example, when the first numerical value of the start time T1 cannot be entered based on the end time T2, an error may be notified. Alternatively, when the first numerical value of the start time T1 cannot be entered based on the end time T2, a default value may be set as the first numerical value. The reference time T3 may be, in addition to the input time and the latest start time, a current time (a time at which the time determination processing is performed). When the schedule is stored in an external storage device other than the information processing apparatus 40, as the reference time T3, the CPU 41 may acquire the latest start time from the external device via wired or wireless communication or the like.

(5-4) The CPU 41 performs the processing at S81 and S82 shown in FIG. 10 such that the start time is in the future of the reference time, but this processing may be omitted in a case in which a past schedule is input by handwriting etc. In the time adjustment processing (V, W) shown in FIG. 12, it is determined whether the numerical values corresponding to the plurality of units of time can be adjusted in ascending order from the numerical value that is smallest in scale, but the present disclosure is not limited to this example. It may be determined whether some of the units of time of the plurality of units of time can be adjusted. In the time entry processing (X, Y) shown in FIG. 8, the determination is made as to whether it is necessary to enter the numerical values corresponding to the plurality of units of time in order from the smallest scale, but the present disclosure is not limited to this example.

(5-5) When it is not necessary to determine whether the numerical value corresponding to each of the units of time is within the allowable range, in the processing at S41, S47 and S52 shown in FIG. 8 and at S57 and S62 shown in FIG. 10, the CPU 41 may determine only whether the numerical value has been set. When it is not necessary to set the all-day schedule flag, the processing at S12 in FIG. 6 may be omitted.

What is claimed is:

1. An information processing apparatus comprising:
    a processor; and
    a memory configured to store computer-readable instructions that, when executed by the processor, cause the information processing apparatus to perform steps comprising:
        acquiring start time data, the start time data being text data that is identified based on first stroke data input by handwriting into an input field that specifies a start time of a schedule;
        acquiring end time data, the end time data being text data that is identified based on second stroke data input by handwriting into an input field that specifies an end time of the schedule;
        first correcting the start time data by entering at least one first numerical value corresponding to a first unit, based on the end time data, when a numerical value corresponding to a unit of time cannot be identified based on the start time data with respect to at least one unit of time among specific units of time that include at least a day, an hour and minutes, the first unit being the unit of time for which the numerical value is not identified based on the start time data;
        second correcting the end time data by entering at least one second numerical value corresponding to a second unit, based on the start time data, when a numerical value corresponding to a unit of time cannot be identified based on the end time data with respect to at least one unit of time among the specific units of time, the second unit being the unit of time for which the numerical value is not identified based on the end time data;
        third correcting of the start time data and the end time data, when both a third numerical value corresponding to the hour and a fourth numerical value corresponding to the minutes cannot be identified based on the start time data and both a fifth numerical value corresponding to the hour and a sixth numerical value corresponding to the minutes cannot be identified based on the end time data, by entering a default value into each of the third numerical value, the fourth numerical value, the fifth numerical value and the sixth numerical value; and
        switching, when performing the third correcting of the start time data and the end time data, a flag that indicates whether the schedule is an all-day schedule from off, which indicates that the schedule is not the all-day schedule, to on, which indicates that the schedule is the all-day schedule.

2. The information processing apparatus according to claim 1, wherein the computer-readable instructions further cause the information processing apparatus to perform steps comprising:
    acquiring a time at which the first stroke data is input by handwriting as an input time; and
    fourth correcting the start time data by entering the first numerical value based on the acquired input time, when, in the first correcting of the start time data, the first numerical value cannot be entered based on the end time data.

3. The information processing apparatus according to claim 2, wherein the fourth correcting the start time data includes
    correcting the start time data by entering the first numerical value such that, based on the acquired input time, the start time represented by the start time data is a future input time, when, in the first correcting of the start time data, the first numerical value cannot be entered based on the end time data.

4. The information processing apparatus according to claim 2, wherein the fourth correcting the start time data includes
    correcting the start time data by entering, when the first unit is in a plurality, the first numerical value corresponding to each of the first units in order from the unit of time of the smallest scale, and entering the first numerical value such that the start time represented by the start time data is a future input time.

5. The information processing apparatus according to claim 1, wherein the computer-readable instructions further cause the information processing apparatus to perform steps comprising:
    causing the start time data to be stored in a storage device when all of the plurality of first, third and fourth numerical values corresponding to each of the specific units of time of the start time are identified based on the start time data; and
    fourth correcting the start time data by entering the first numerical value based on latest start time data that is stored at a most recent time among the start time data stored in the storage device, when, in the first correcting of the start time data, the first numerical value cannot be entered based on the end time data.

6. The information processing apparatus according to claim 1, wherein the computer-readable instructions further cause the information processing apparatus to perform steps comprising:
    acquiring an allowable range of the numerical value corresponding to the unit of time, the allowable range being established with respect to each of the specific units of time;
    first determining that the numerical value corresponding to the unit of time is not identified when, with respect to the first, third and fourth, numerical values corresponding to the specific units of time of the start time represented by the start time data, the numerical value corresponding to the unit of time is not within the allowable range; and second determining that the numerical value corresponding to the unit of time is not identified when, with respect to the second, fifth and sixth numerical values corresponding to the specific units of time of the end time represented by the end time data, the numerical value corresponding to the unit of time is not within the allowable range;

wherein the first correcting the start time data includes
determining whether each of the specific units of time of the start time is the first unit based on a determination result of the first determining, and the second correcting the end time data includes
determining whether each of the specific units of time of the end time is the second unit based on a determination result of the second determining.

7. The information processing apparatus according to claim 1, wherein the specific units of time include a year and a month, in addition to the day, the hour and the minutes.

8. The information processing apparatus according to claim 1, wherein the second correcting the end time data includes
correcting the end time data by entering the second numerical value based on a time that is a specific time period after the start time represented by the start time data.

9. The non-transitory recording medium storing computer-readable instructions that, when executed by a processor of an information processing apparatus, cause the information processing apparatus to perform steps comprising:
acquiring start time data, the start time data being text data that is identified based on first stroke data input by handwriting into an input field that specifies a start time of a schedule;
acquiring end time data, the end time data being text data that is identified based on second stroke data input by handwriting into an input field that specifies an end time of the schedule;
first correcting the start time data by entering at least one first numerical value corresponding to a first unit, based on the end time data, when a numerical value corresponding to a unit of time cannot be identified based on the start time data with respect to at least one unit of time among specific units of time that include at least a day, an hour and minutes, the first unit being the unit of time for which the numerical value is not identified based on the start time data; and
second correcting the end time data by entering at least one second numerical value corresponding to a second unit, based on the start time data, when a numerical value corresponding to a unit of time cannot be identified based on the end time data with respect to at least one unit of time among the specific units of time, the second unit being the unit of time for which the numerical value is not identified based on the end time data,
third correcting of the start time data and the end time data, when both a third numerical value corresponding to the hour and a fourth numerical value corresponding to the minutes cannot be identified based on the start time data and both a fifth numerical value corresponding to the hour and a sixth numerical value corresponding to the minutes cannot be identified based on the end time data, by entering a default value into each of the third numerical value, the fourth numerical value, the fifth numerical value and the sixth numerical value; and switching, when performing the third correcting of the start time data and the end time data, a flag that indicates whether the schedule is an all-day schedule from off, which indicates that the schedule is not the all-day schedule, to on, which indicates that the schedule is the all-day schedule.

10. The non-transitory recording medium according to claim 9, wherein the computer-readable instructions further cause the information processing apparatus to perform steps comprising:
acquiring a time at which the first stroke data is input by handwriting as an input time; and
fourth correcting the start time data by entering the first numerical value based on the acquired input time, when, in the first correcting of the start time data, the first numerical value cannot be entered based on the end time data.

11. The non-transitory recording medium according to claim 10, wherein the fourth correcting the start time data includes
correcting the start time data by entering the first numerical value such that, based on the acquired input time, the start time represented by the start time data is a future of the input time, when, in the first correcting of the start time data, the first numerical value cannot be entered based on the end time data.

12. The non-transitory recording medium according to claim 10, wherein the fourth correcting the start time data includes
correcting the start time data by entering, when the first unit is in a plurality, the first numerical value corresponding to each of the first units in order from the unit of time of the smallest scale, and entering the first numerical value such that the start time represented by the start time data is a future input time.

13. The non-transitory recording medium according to claim 9, wherein the computer-readable instructions further cause the information processing apparatus to perform steps comprising: causing the start time data to be stored in a storage device when all of the first, third and fourth numerical values corresponding to each of the specific units of time of the start time are identified based on the start time data; and fourth correcting the start time data by entering the first numerical value based on latest start time data that is stored at a most recent time among the start time data stored in the storage device, when, in the first correcting of the start time data, the first numerical value cannot be entered based on the end time data.

14. The non-transitory recording medium according to claim 9, wherein the computer-readable instructions further cause the information processing apparatus to perform steps comprising:
acquiring an allowable range of the numerical value corresponding to the unit of time, the allowable range being established with respect to each of the specific units of time;
first determining that the numerical value corresponding to the unit of time is not identified when, with respect to the first, third and fourth numerical values corresponding to the specific units of time of the start time represented by the start time data, the numerical value corresponding to the unit of time is not within the allowable range; and
second determining that the numerical value corresponding to the unit of time is not identified when, with respect to the second, fifth and sixth numerical values corresponding to the specific plurality of units of time of the end time represented by the end time data, the numerical value corresponding to the unit of time is not within the allowable range;

wherein the first correcting the start time data includes
- determining whether each of the specific units of time of the start time is the first unit based on a determination result of the first determining, and the second correcting the end time data includes
- determining whether each of the specific units of time of the end time is the second unit based on a determination result of the second determining.

15. The non-transitory recording medium according to claim 9, wherein the specific units of time include a year and a month, in addition to the day, the hour and the minutes.

16. The non-transitory recording medium according to claim 9, wherein the second correcting the end time data includes correcting the end time data by entering the second numerical value based on a time that is a specific time period after the start time represented by the start time data.

\* \* \* \* \*

UNITED STATES PATENT AND TRADEMARK OFFICE
CERTIFICATE OF CORRECTION

PATENT NO.          : 9,513,800 B2                                           Page 1 of 1
APPLICATION NO.     : 14/062944
DATED               : December 6, 2016
INVENTOR(S)         : Sugimura It is certified that error appears in the above-identified patent and that said Letters Patent is hereby corrected as shown below:

In the Claims

Column 24, Claim 5, Line 43:
Delete "the plurality of first" and insert --the first--

Column 25, Claim 6, Line 7:
Delete "allowable range; wherein" and insert --allowable range, wherein--

Column 25, Claim 9, Line 28:
Delete "The non-transitory" and insert --A non-transitory--

Column 26, Claim 11, Line 24:
Delete "future of the input" and insert --future input--

Column 26, Claim 14, Line 67:
Delete "specific plurality of units" and insert --specific units--

Column 27, Claim 14, Line 3:
Delete "allowable range; wherein" and insert --allowable range, wherein--

Signed and Sealed this
Second Day of May, 2017

Michelle K. Lee
*Director of the United States Patent and Trademark Office*